March 31, 1953     L. J. DENNEY ET AL     2,633,497
TELEPHONE SWITCHING SYSTEM WITH SELECTION
OF LOCAL OR TRUNK LINES
Filed April 5, 1948     23 Sheets-Sheet 1

Inventors
L. JOHN DENNEY
HOWARD G. DUHAMEL
RALPH WILLIAM ENGSBERG

By Lucy P. Lantzy, Attorney

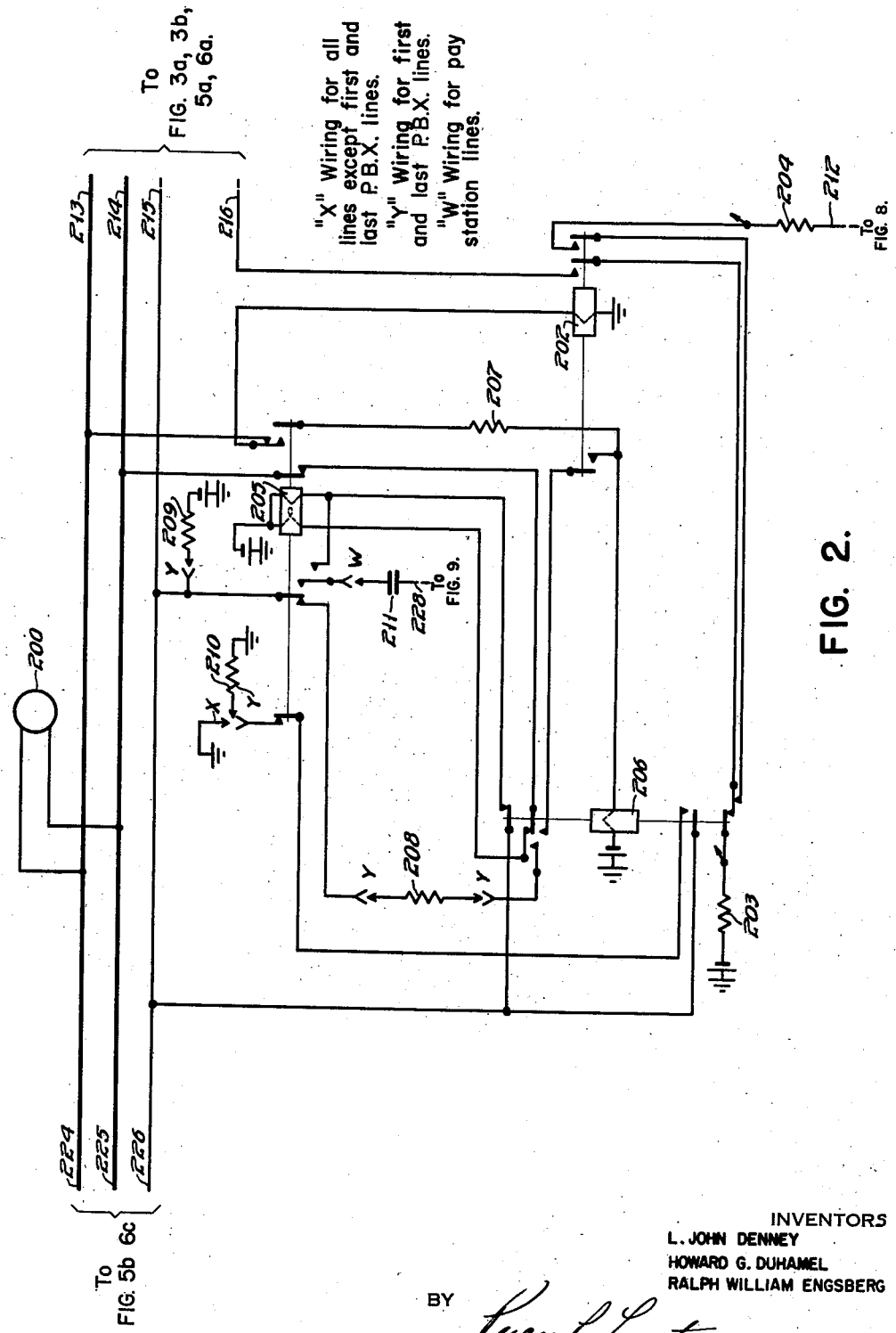

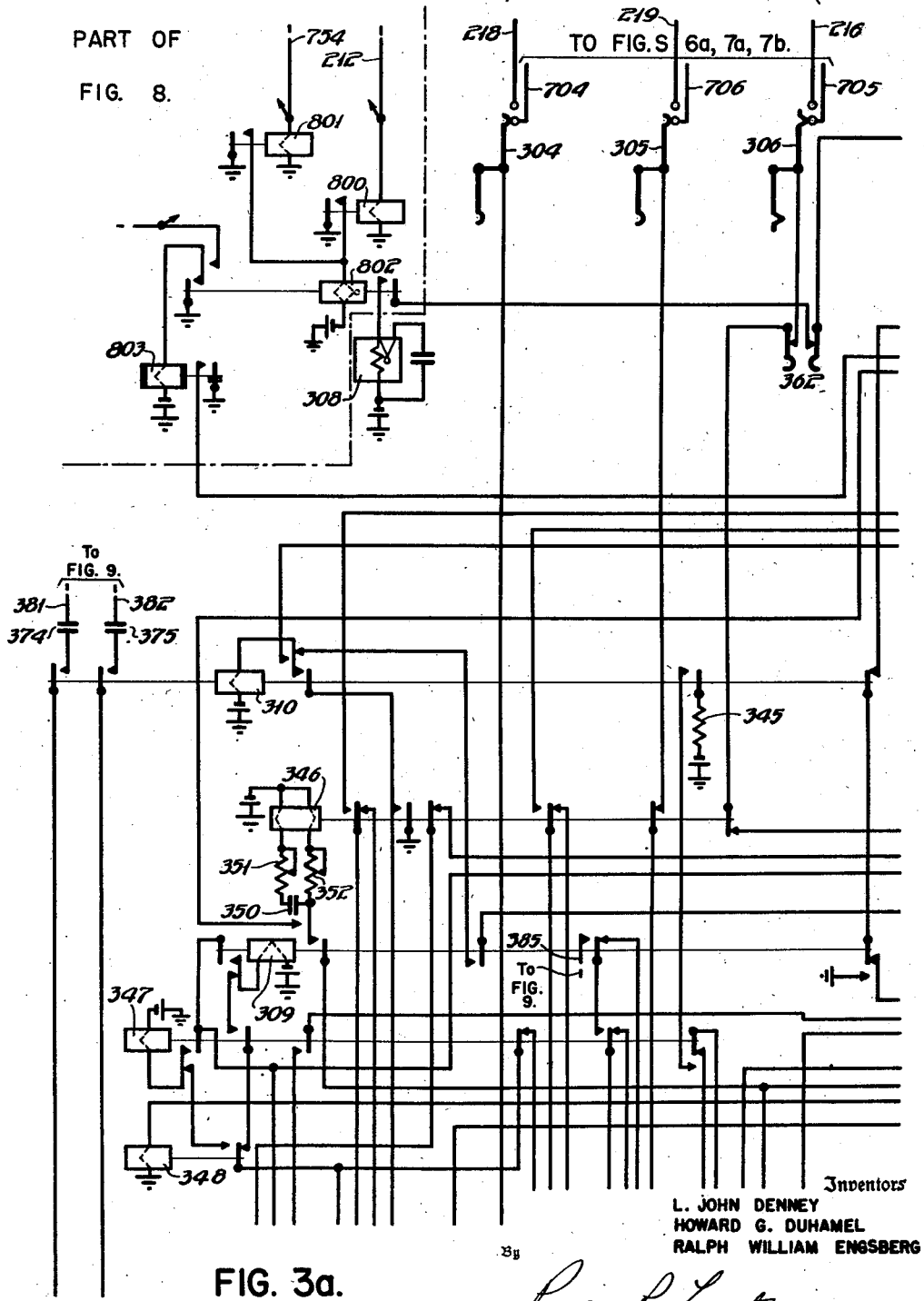

Inventors
L. JOHN DENNEY
HOWARD G. DUHAMEL
RALPH WILLIAM ENGSBERG

Attorney

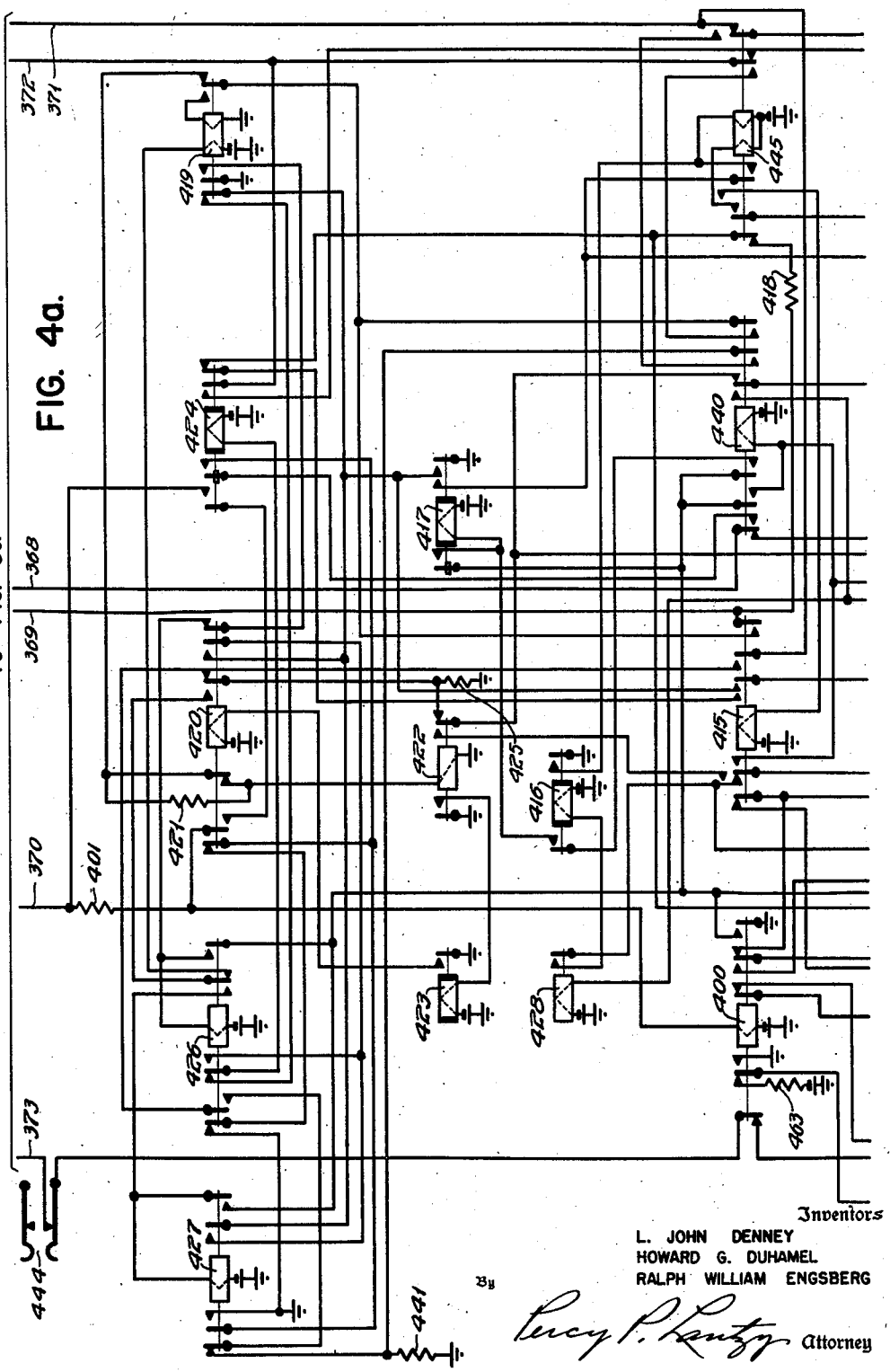

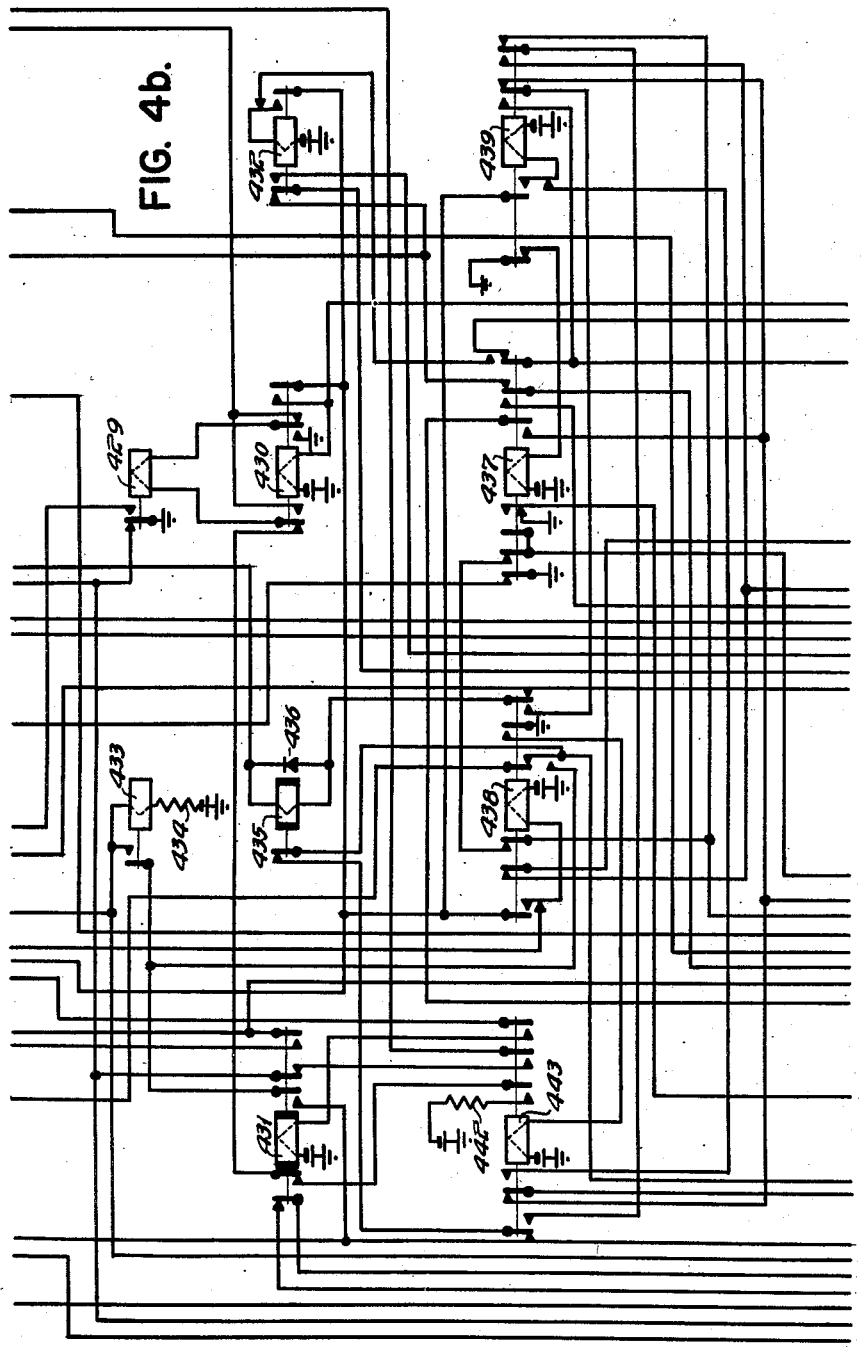

March 31, 1953

L. J. DENNEY ET AL 2,633,497

TELEPHONE SWITCHING SYSTEM WITH SELECTION OF LOCAL OR TRUNK LINES

Filed April 5, 1948

Inventors
L. JOHN DENNEY
HOWARD G. DUHAMEL
RALPH WILLIAM ENGSBERG

By Percy P. Lantz Attorney

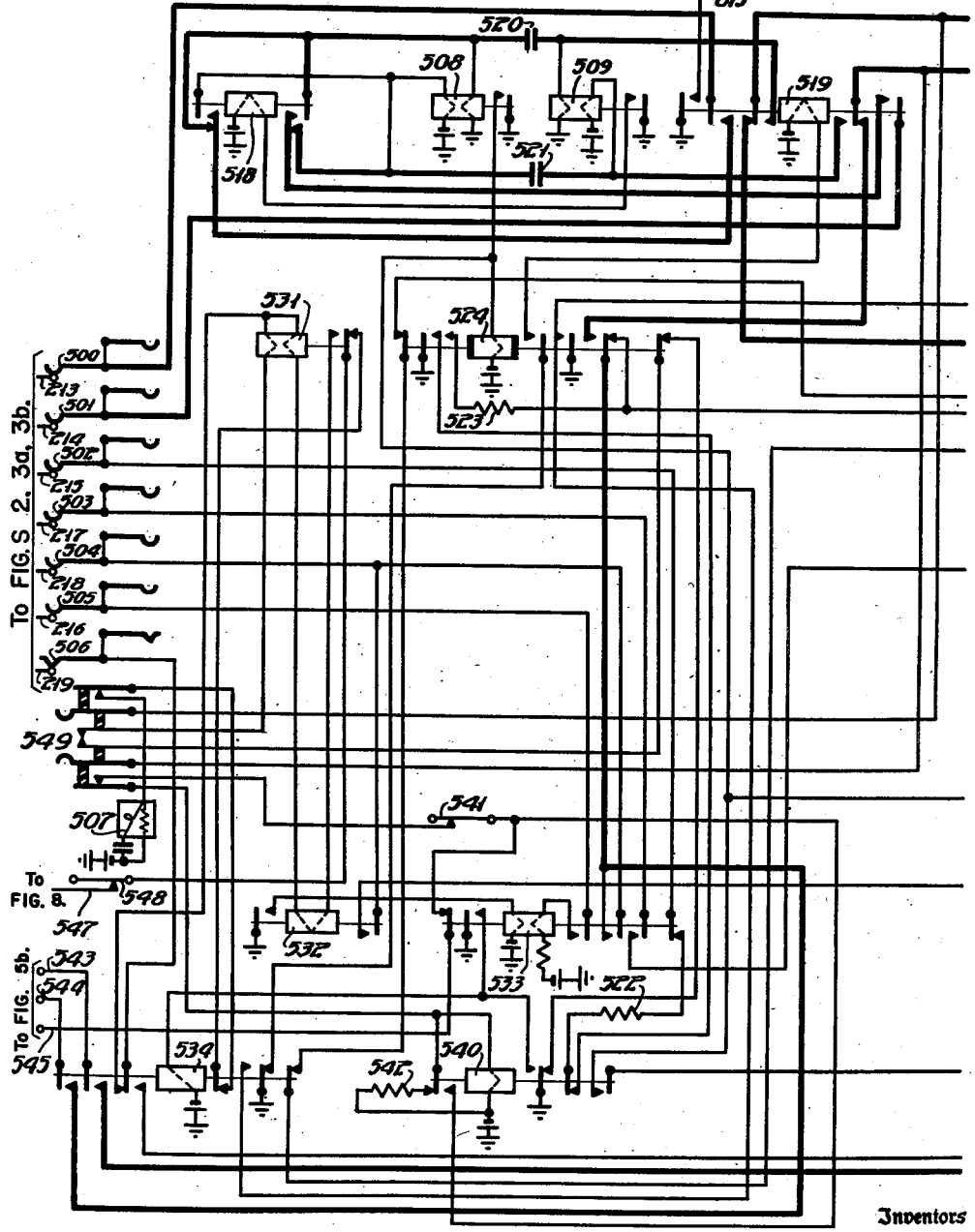

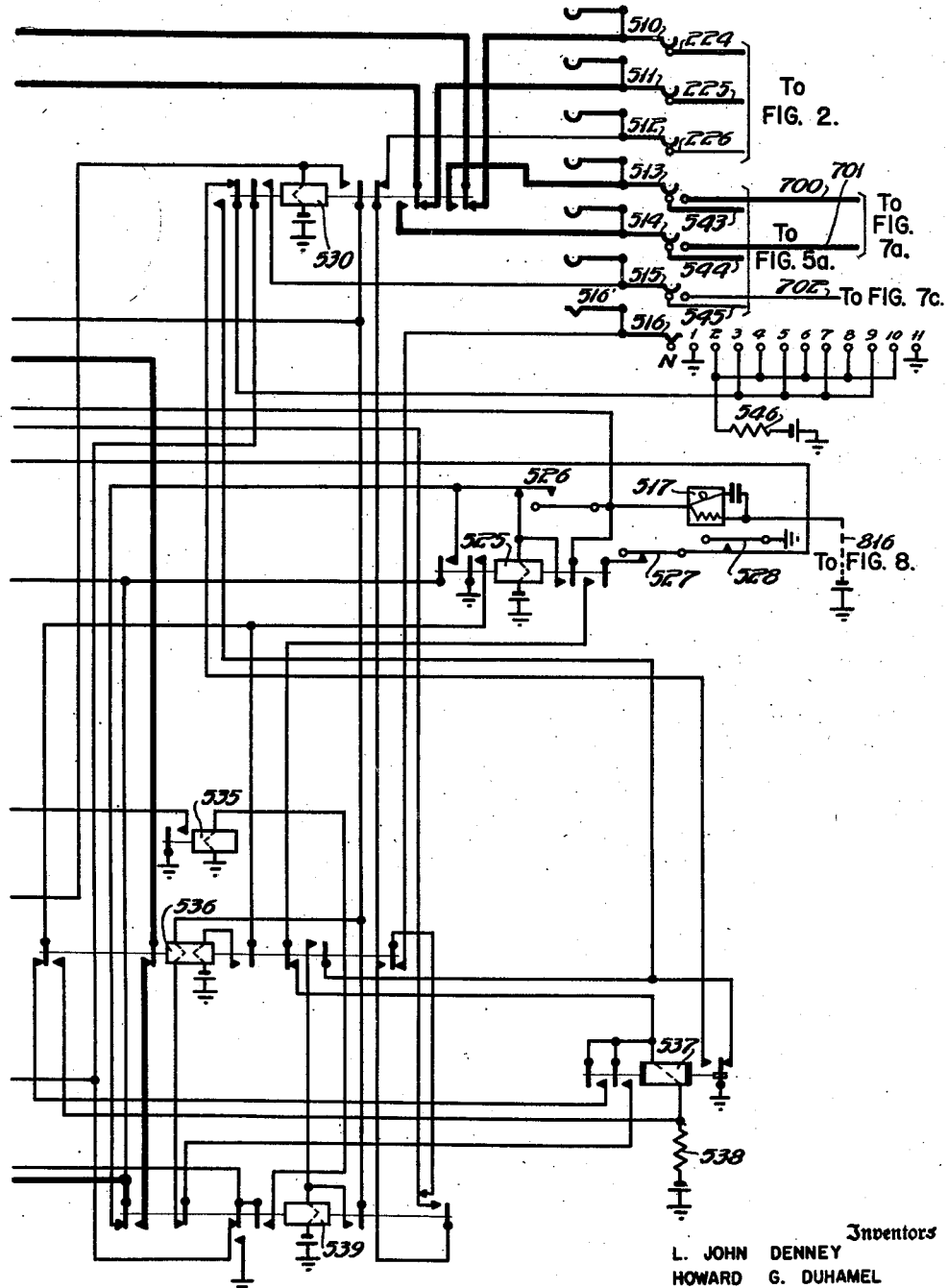

March 31, 1953   L. J. DENNEY ET AL   2,633,497
TELEPHONE SWITCHING SYSTEM WITH SELECTION
OF LOCAL OR TRUNK LINES
Filed April 5, 1948   23 Sheets-Sheet 13

Inventors
L. JOHN DENNEY
HOWARD G. DUHAMEL
RALPH WILLIAM ENGSBERG

By Percy P. Lantz   Attorney

March 31, 1953 L. J. DENNEY ET AL 2,633,497
TELEPHONE SWITCHING SYSTEM WITH SELECTION
OF LOCAL OR TRUNK LINES
Filed April 5, 1948 23 Sheets-Sheet 14

Inventors
L. JOHN DENNEY
HOWARD G. DUHAMEL
RALPH WILLIAM ENGSBERG

By Percy P. Lantzy Attorney

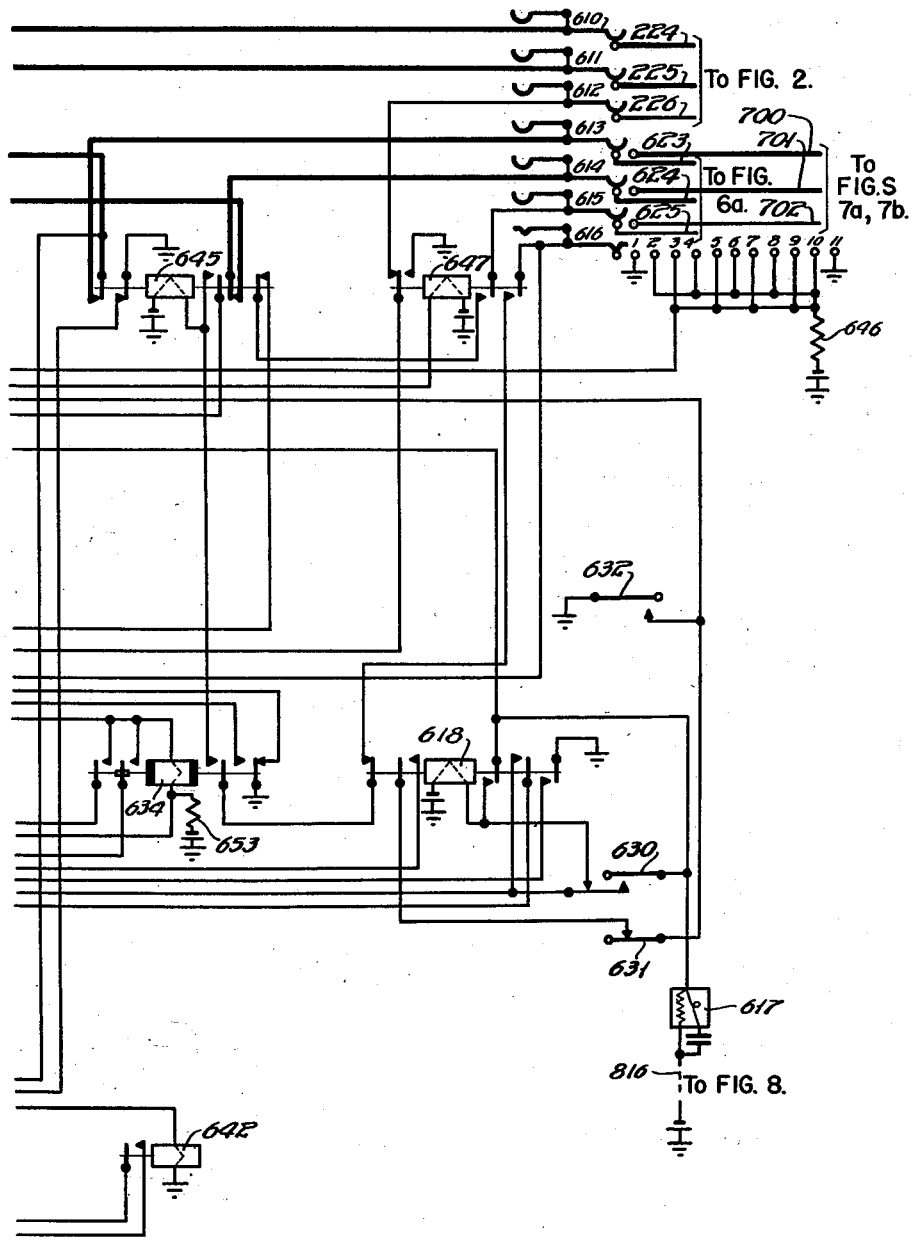

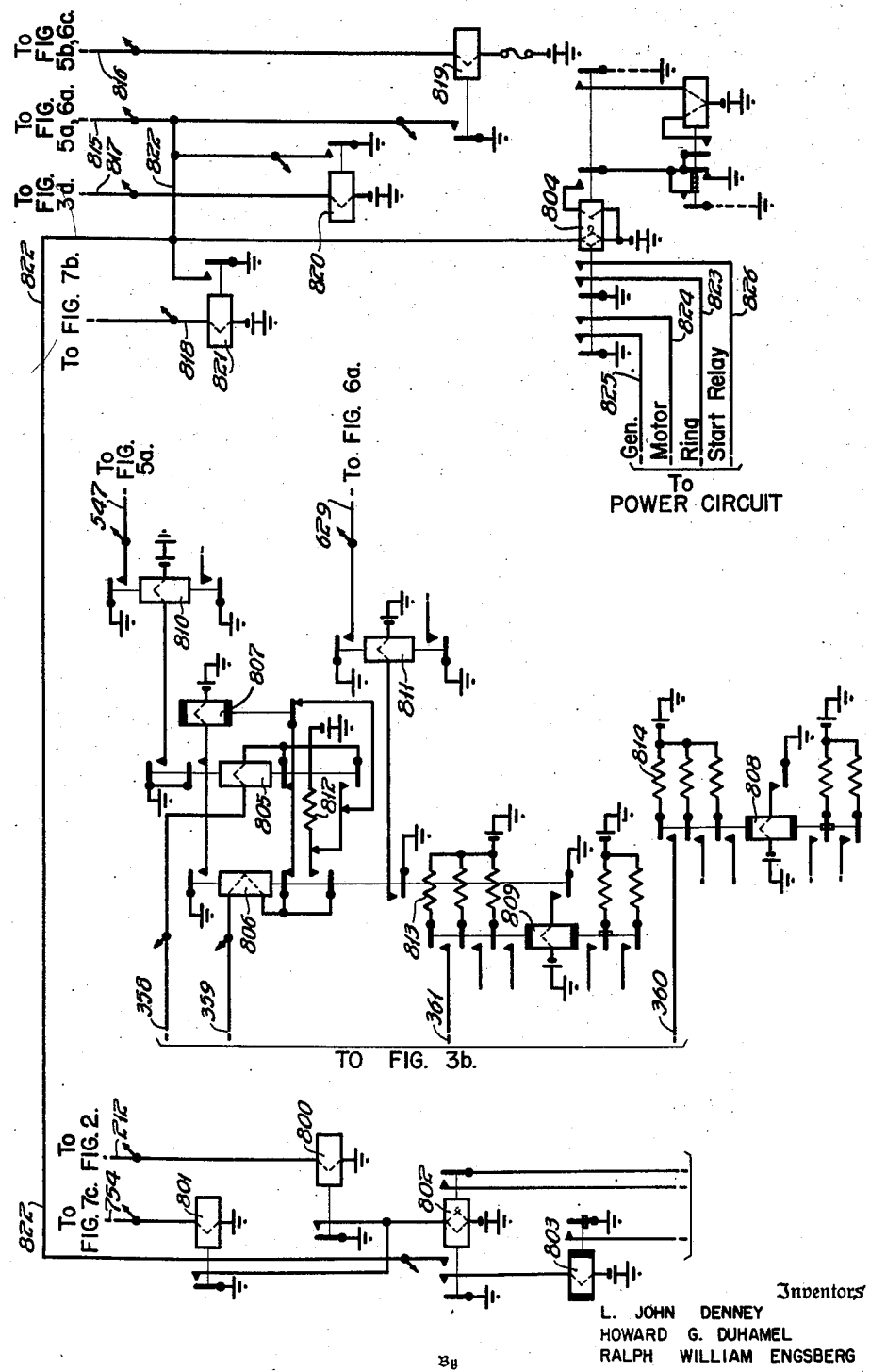

March 31, 1953    L. J. DENNEY ET AL    2,633,497
TELEPHONE SWITCHING SYSTEM WITH SELECTION
OF LOCAL OR TRUNK LINES
Filed April 5, 1948                          23 Sheets—Sheet 21
FIG. 9.
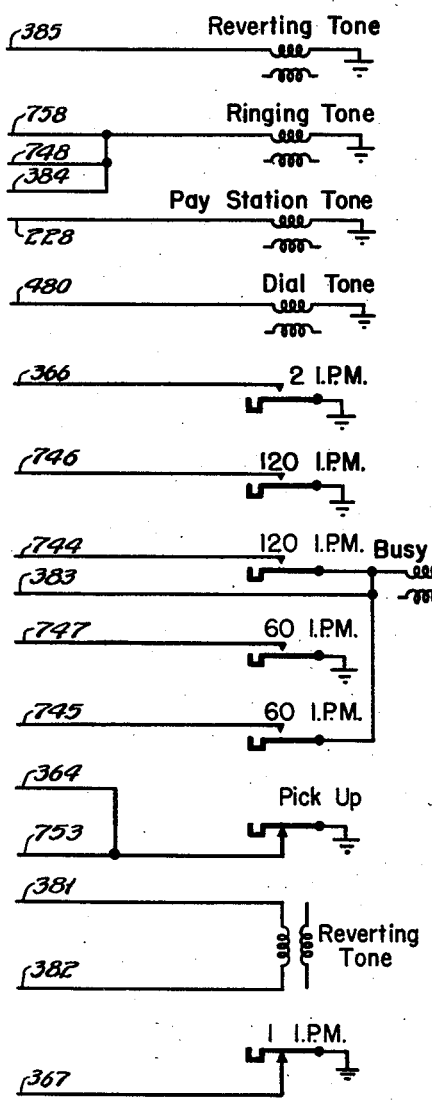
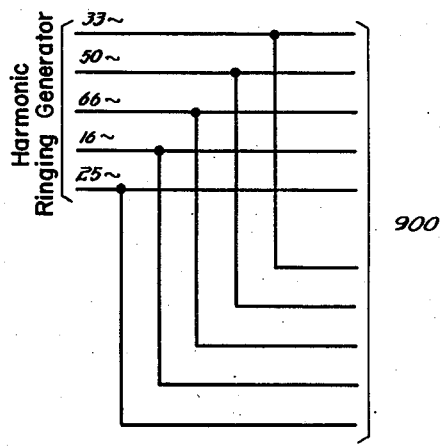
Inventors
L. JOHN DENNEY
HOWARD G. DUHAMEL
RALPH WILLIAM ENGSBERG
By Percy P. Lantzy   Attorney

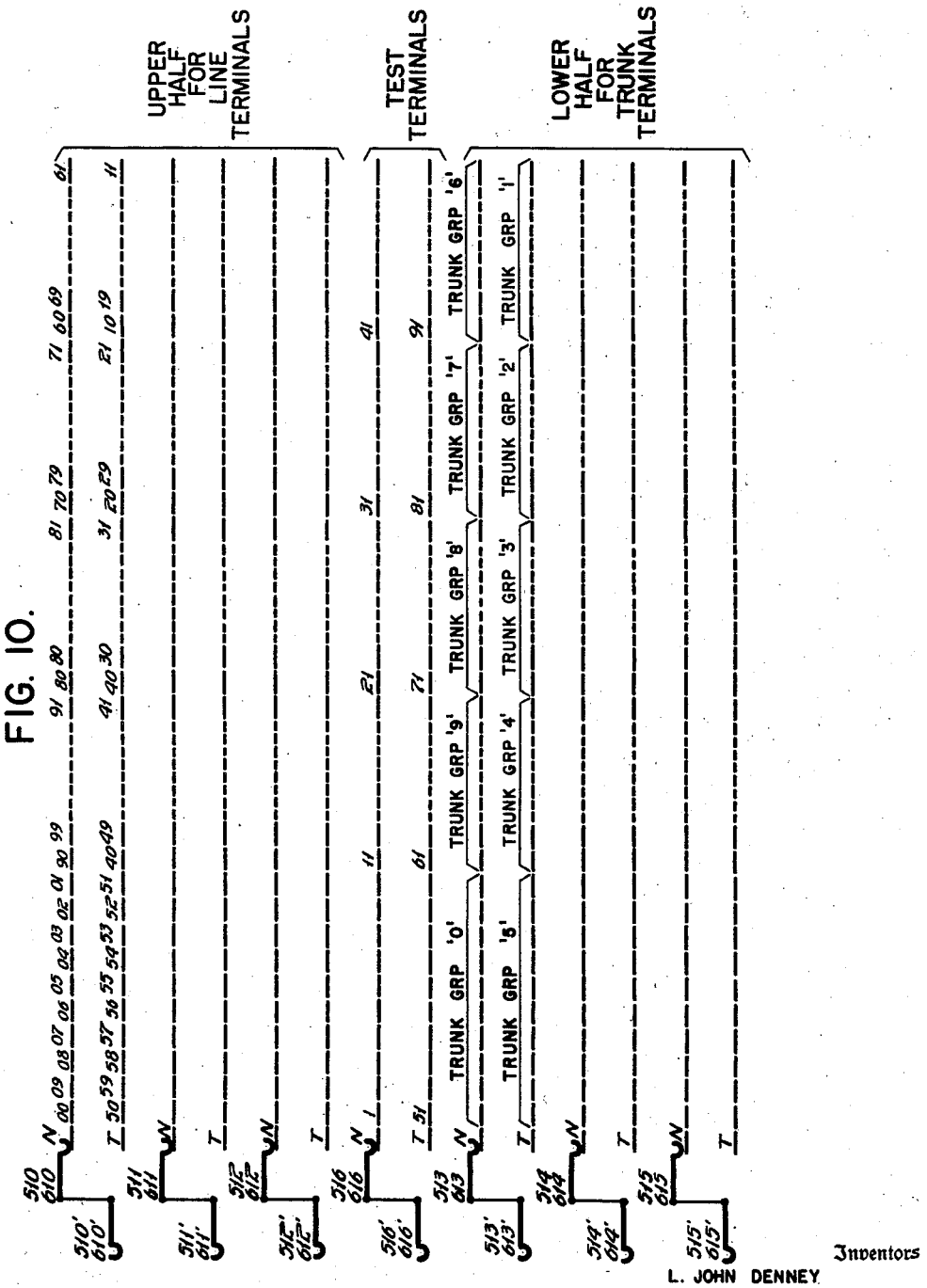

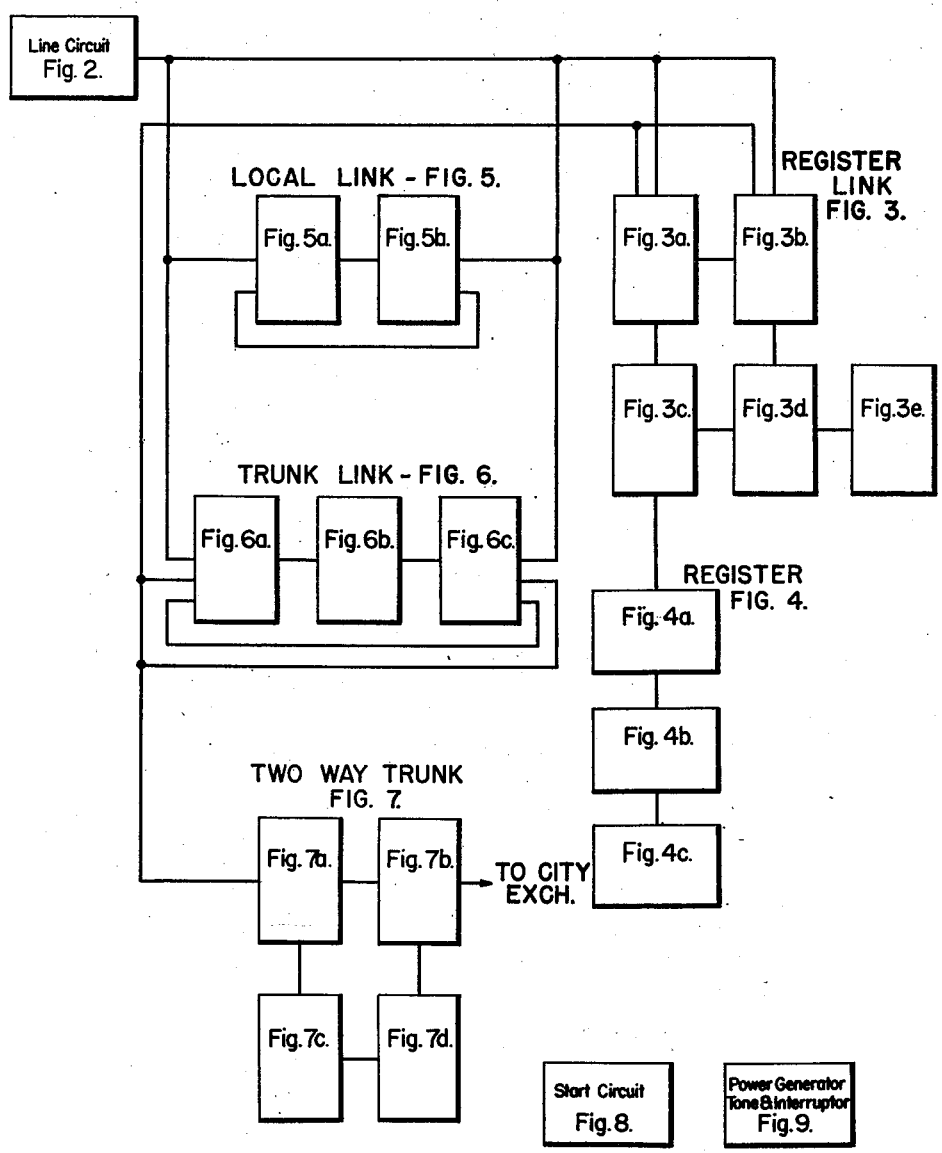

Patented Mar. 31, 1953

2,633,497

UNITED STATES PATENT OFFICE 2,633,497

TELEPHONE SWITCHING SYSTEM WITH SELECTION OF LOCAL OR TRUNK LINES

Lee John Denney, Nutley, Howard G. Duhamel, Verona, and Ralph W. Engsberg, Nutley, N. J., assignors to Federal Telephone and Radio Corporation, New York, N. Y., a corporation of Delaware Application April 5, 1948, Serial No. 19,024

43 Claims. (Cl. 179—18)

This invention relates to new and useful improvements in automatic switching systems for small, unattended telephone exchanges such as are used in rural communities.

To meet the requirements for telephone service in such communities provision must be made for the establishment of connections between the local subscribers within the community. When such an unattended exchange is connected to a central office, the local subscribers should be able to establish connections to the operators at the central office. Provision is also required for selectively controlling the ringing of a desired party on multi-party lines and for reverting calls from one party to another on the same line.

This is a continuation-in-part of our application, Serial No. 774,556 filed September 17, 1947.

According to one feature of the invention, separate paths are provided for local and toll calls to minimize the chance of a toll call becoming blocked by the busy condition of all local paths. This is accomplished by providing local and trunk links each with such means, e. g., line finders and selectors, for attaching the links to the calling and called lines.

Another feature of the invention provides for the use of registers for controlling the selectors as well as the selection of a local or trunk path depending upon the called number and the connection of the path with the calling line.

A register is connected with the calling line through a register link at which some or all of the following controls may be executed; (a) selection of a local or trunk link depending upon a called digit, e. g., hundred; (b) dial or busy tone; (c) party line ringing; (d) revertive call tone; (e) revertive call ringing; and (f) revertive answer tone.

These, and other features of the invention will more clearly appear from the claims and the description of the embodiment of the invention which is diagrammatically illustrated in the following drawings:

Fig. 2 shows the subscriber's line circuit.

Figure 4C:
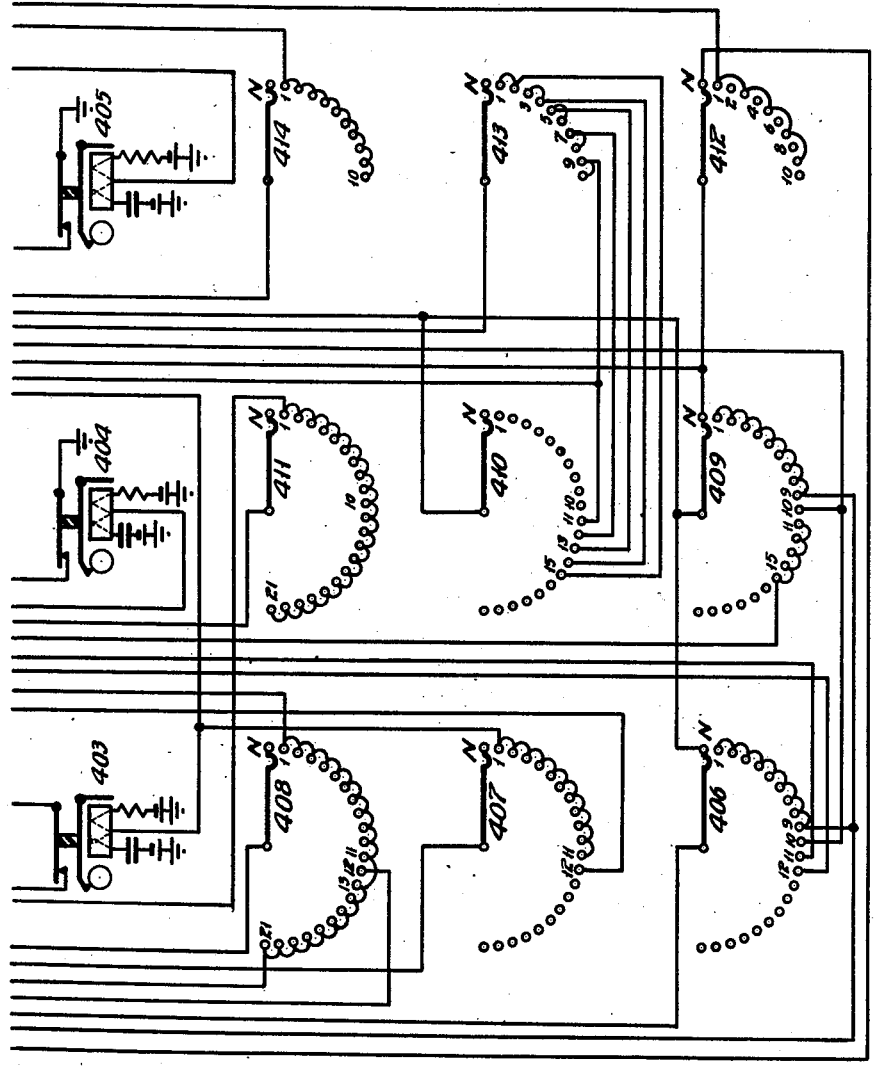

Fig. 4 designates the register circuit when the three sheets designated as Fig. 4a, 4b, 4c are placed together as indicated in Fig. 11.

Fig. 5 shows the local link circuit when the two sheets designated as Fig. 5a, and 5b are placed together as indicated in Fig. 11.

Figure 6A:
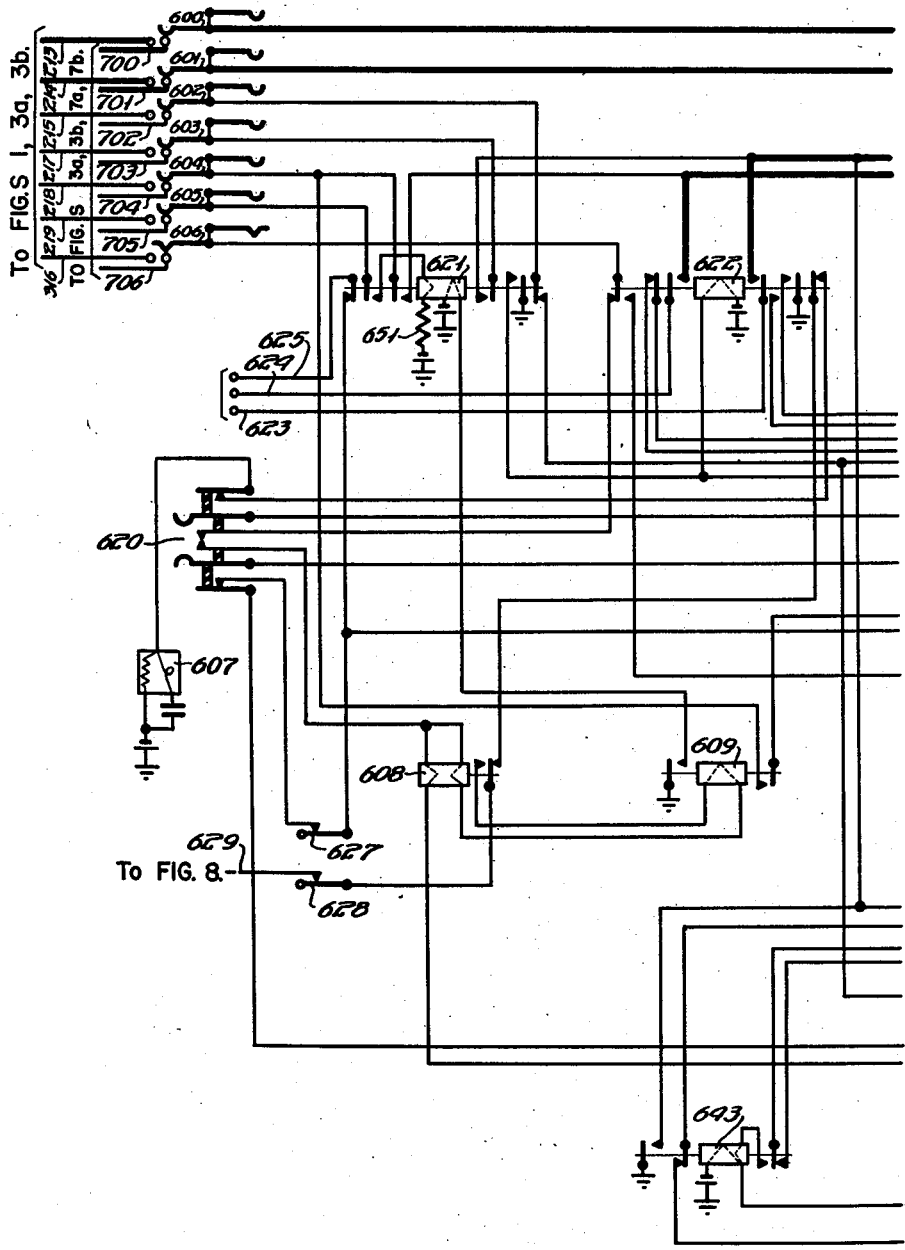
Figure 6B:
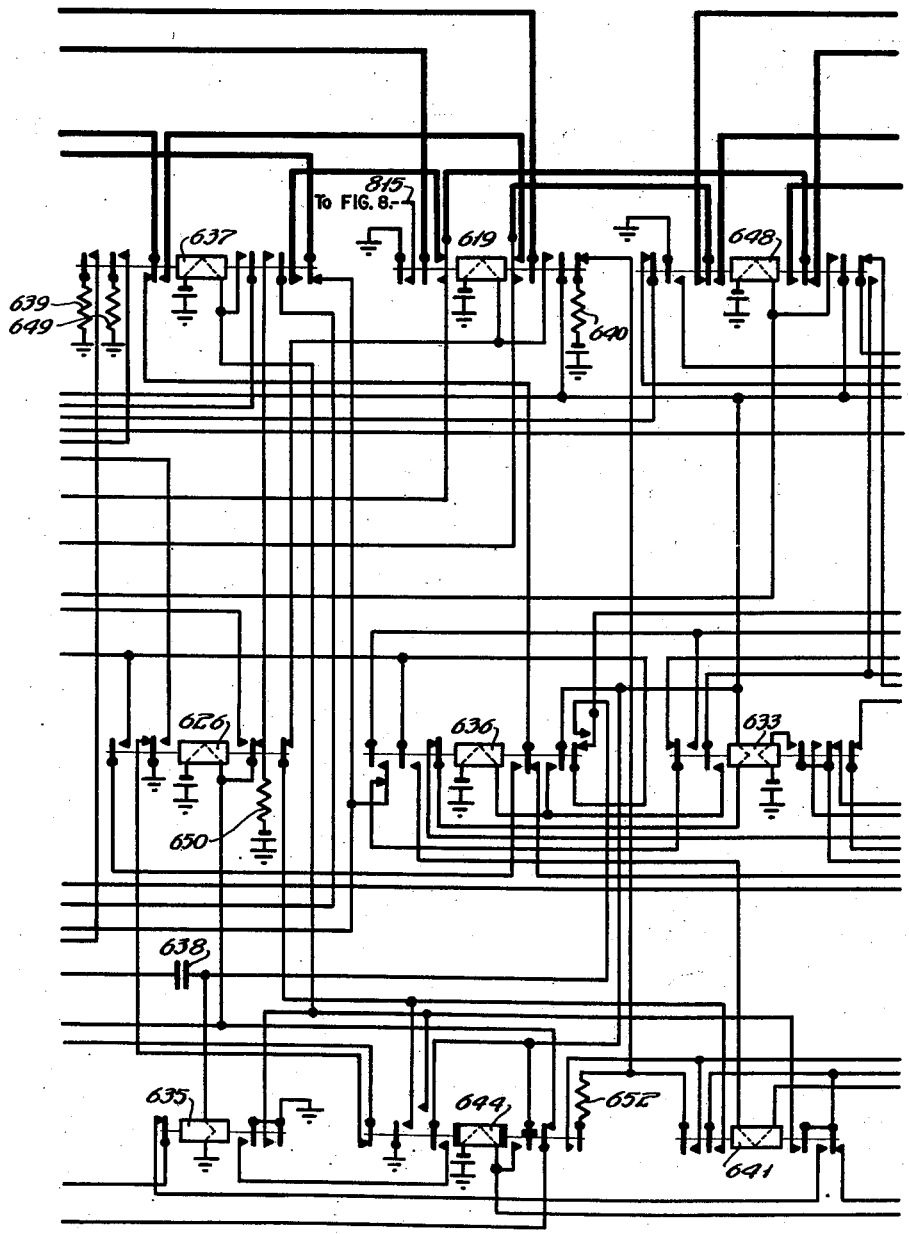
Figure 7A:
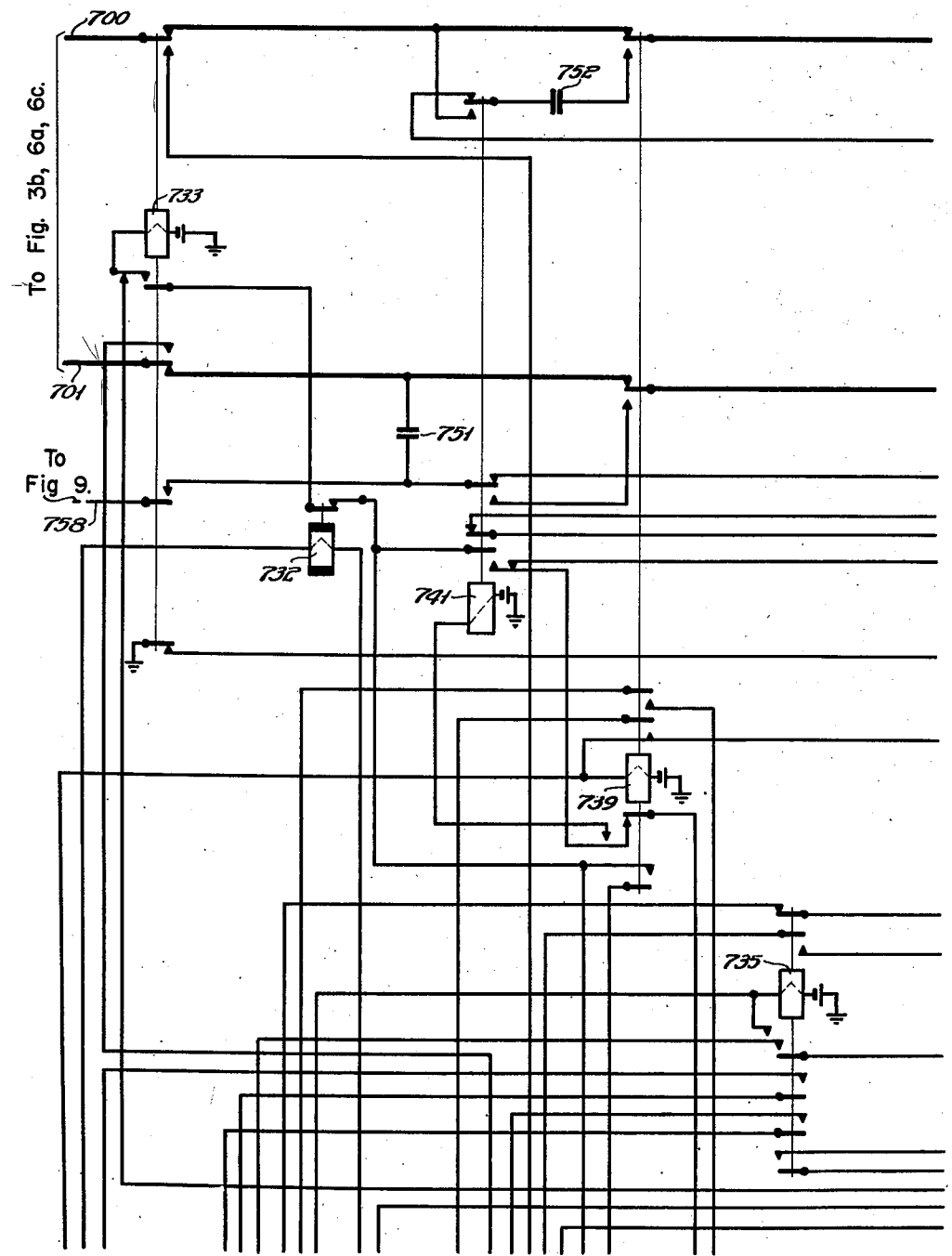
Figure 7B:
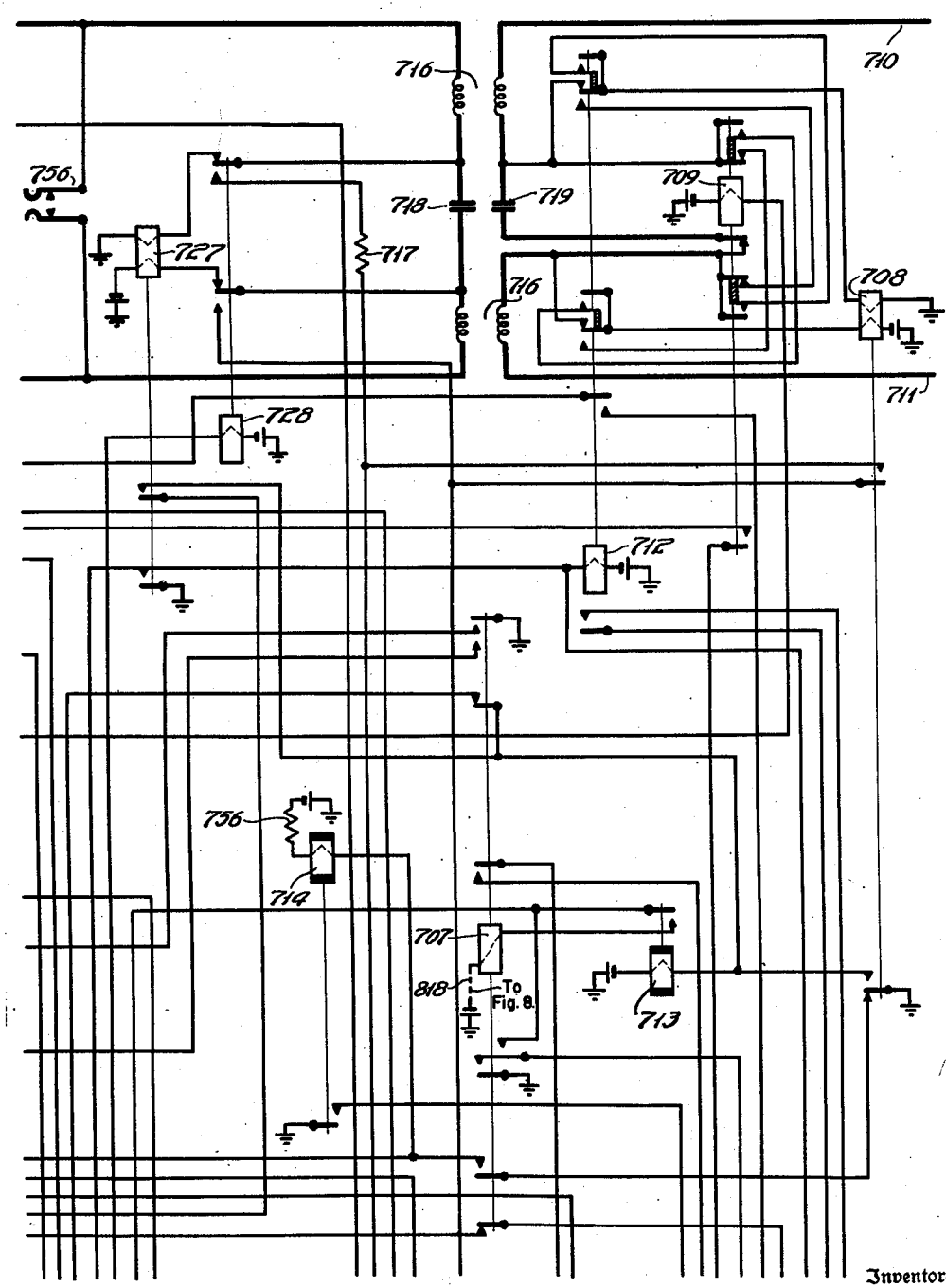
Figure 7C:
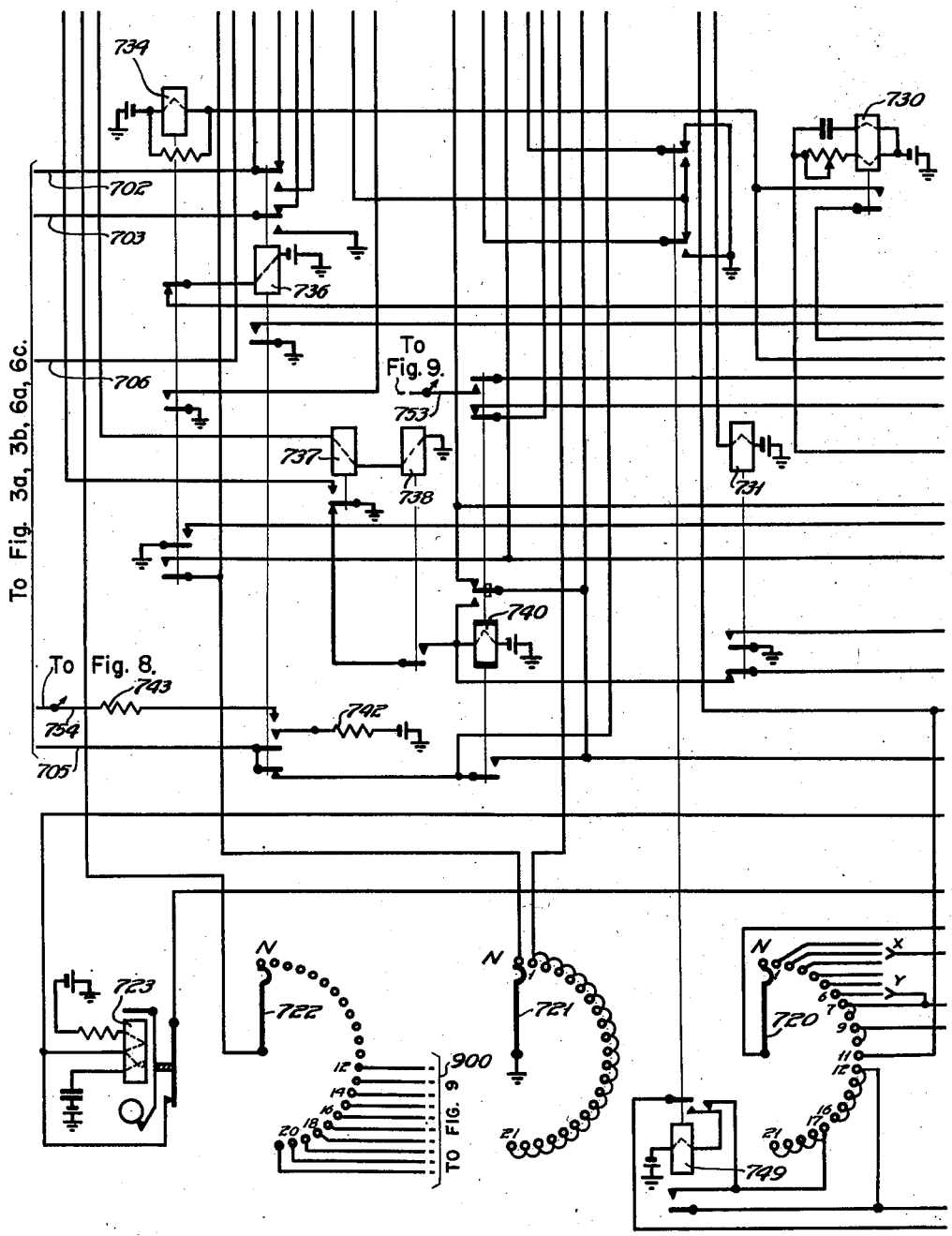
Figure 7D:
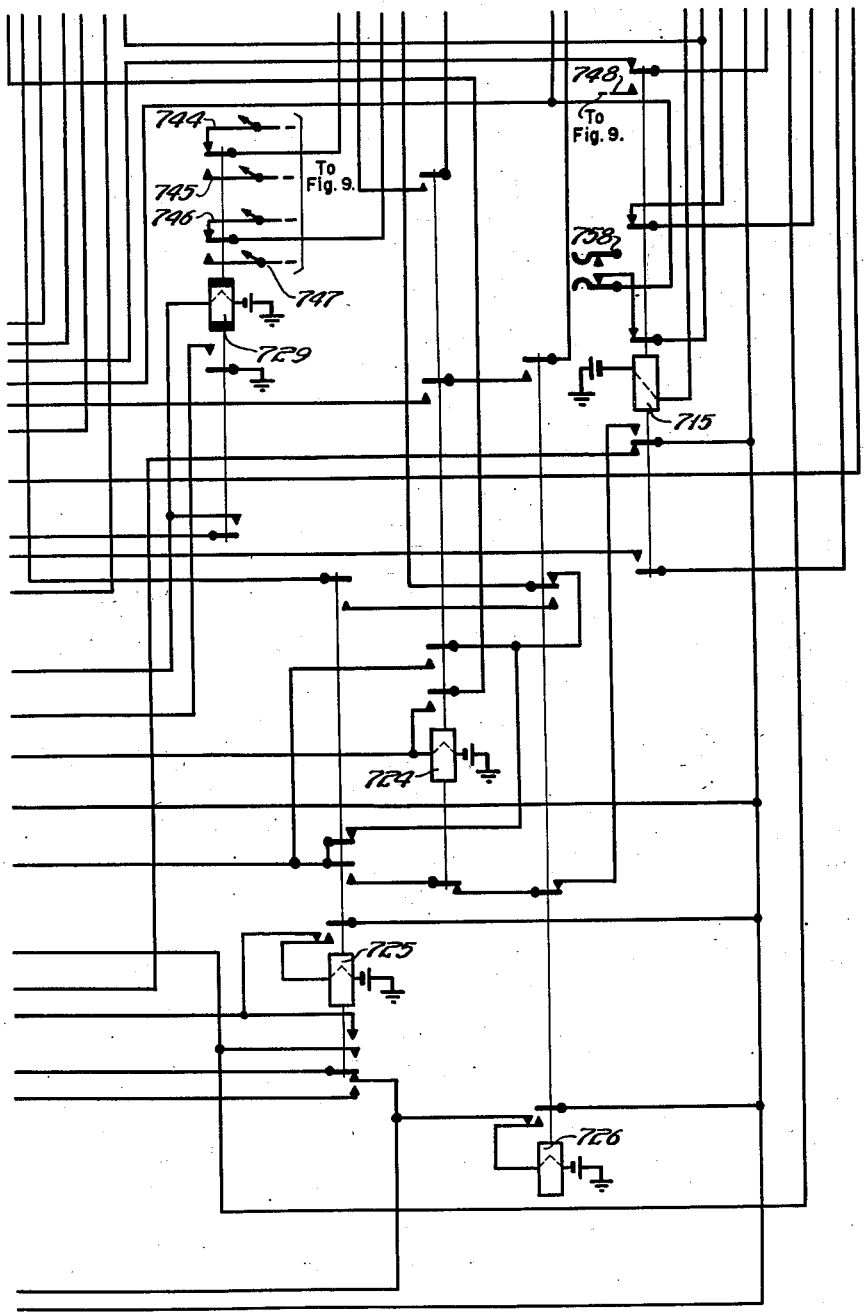

Fig. 6 shows the trunk link circuit when the three sheets designated 6a, 6b, and 6c are placed together as indicated in Fig. 11.

Fig. 7 shows the two-way trunk circuit when the four sheets designated 7a, 7b, 7c, and 7d are placed together as indicated in Fig. 11.

Fig. 8 shows the starting circuit which is common to the exchange and provides for starting the motors and provides the test potentials common to the various circuits.

Fig. 9 shows, diagrammatically, the tone, ringing and interrupter circuits which form part of the power plant for the system.

Fig. 10 shows the bank assignment for the selectors.

Fig. 11 shows the arrangement of the sketches from Figs. 2 to 7.

Figure 1:
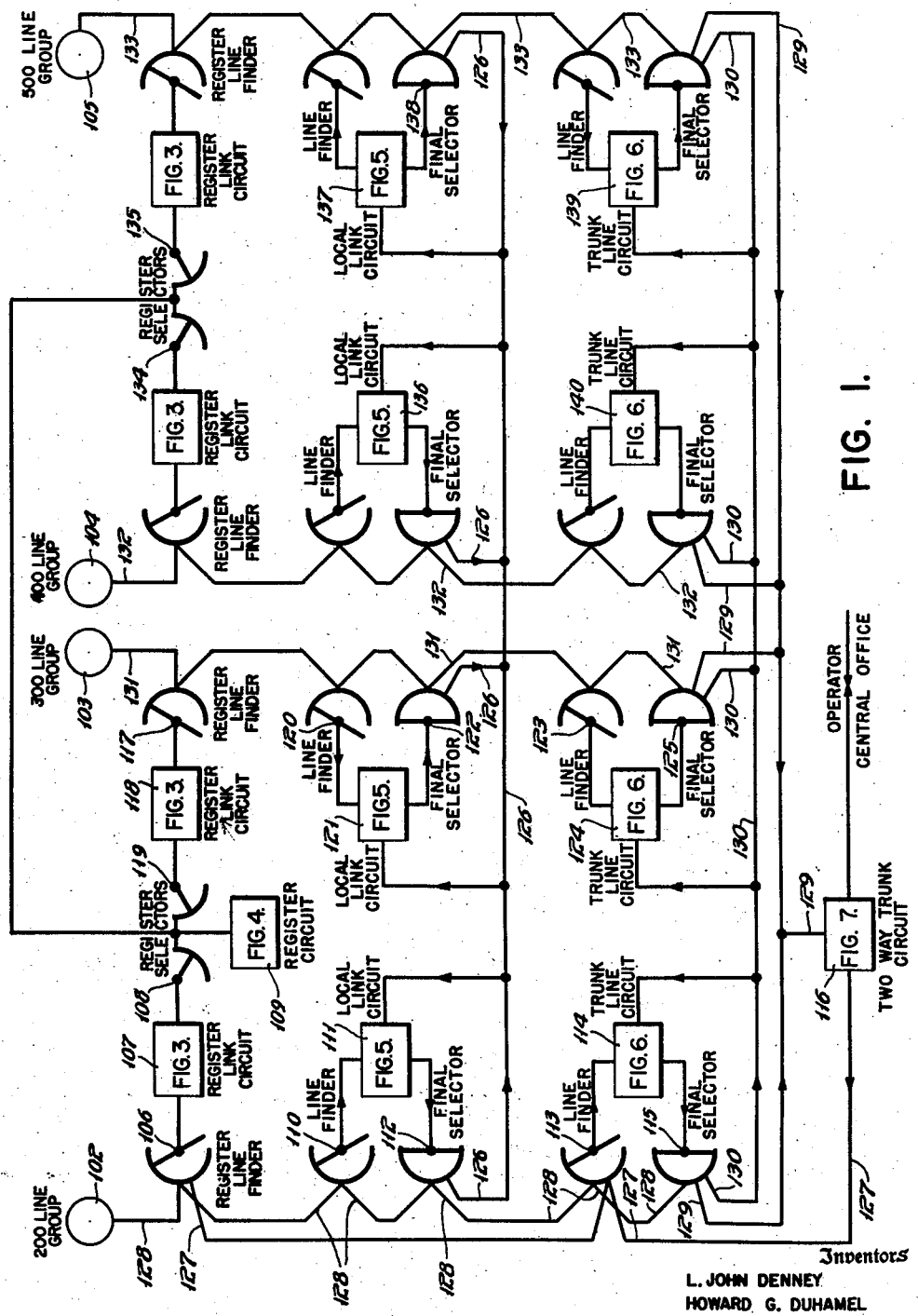
Fig. 1 shows, diagrammatically, a system serving 400 lines.

Fig. 1 diagrammatically illustrates a system serving 400 lines. A rotary 100-point power driven switch having seven brushes is employed as a register line finder 106, a line finder 110 and a final selector 112. A register link circuit 107 employs, in addition to the line finder 106, a rotary step-by-step switch 108 to select an idle register 109. Each local link circuit 111 has a finder 110, a final selector 112. All seven brushes are used on the line finder but only four of the brushes of the final selector are used for calls within the 100-line group served by the associated local link. On calls to other 100-line groups the other three brushes and one of the first four mentioned of the final selector are employed. Access to the local link 111 may be had from other links 121, 136 and 137 over a three wire circuit 126.

Trunk links 114, 124, 140 and 139 are employed which are similar to the local links 111, 121, 136, and 137 except that they contain metallic transmission circuits without battery supply whereas the local links supply battery through a condenser feed bridge.

Two-way interoffice trunk circuits 116 are employed which terminate in a six conductor circuit, three of which are used for the line circuit at final selectors of the trunk link circuits 114, 124, 140 and 139 while the other three serve for hunting purposes at the terminals of the line finders 106 and 113.

The arrows in Fig. 1 indicate the direction of the calls.

For installations up to 100 lines, only the line finders 106, 110 and 113, the final selectors 112 and 115, links 107, 111 and 114, register selectors 108, registers 109, and two-way trunks 116, need be provided in sufficient quantities to satisfy traffic requirements. An installation for 200 lines does not require duplication of all equipment but the lines of the additional group, e. g. 103, need their own line finders 117, 120, 123 and final selectors 122 and 125 with appropriate local and trunk links 121 and 124, and register links 118, which may be connected with registers 109 via register selectors 119. The same duplication is required for the third and fourth hundred lines added to the system. The registers, like 109, are accessible over the register selectors 134 of the 400-line groups and the register selectors 135 of the 500-line group. It will be understood, of course, that while 400 lines have been referred to in this embodiment by way of example only, many more 100-line groups are contemplated. The two-way trunk circuits like 116 are accessible to all the groups over the 3 wire circuits 129. These trunk circuits 116 terminate in conductors 127 on the banks of the line finders 106 and 113. They require line numbers but no line circuits. The line numbers of the trunk circuits need not be consecutive.

When a subscriber 102, belonging to the 200-line group, calls, the line relay energizes the start circuit which starts the line finder 106 of all the idle register links 107 serving the 200 group of lines and places a potential on the test terminal of the register line finder 106. The line finders 106 of the register links, like 107, hunt together and when one finds the calling line, the cutoff relay is operated and the energizing condition is withdrawn from the start circuit which removes the test potential from the test terminals. As soon as the line finder 106 of the register link finds the line, an idle register 109 is selected by the register selector 108 and when the register is attached to the register link 107, dial tone is transmitted from the register link to the calling subscriber 102.

The line circuits are used for originating subscribers' calls, for making subscribers' lines busy, for revertive calls and for locking out faulty lines. Transmission battery for faulty or locked out lines, is provided over the windings of line and lockout relays as will be described later. Furthermore, provision may be made for signals identifying pay station lines and first and last lines of P. B. X groups. The register link 107 identifies the call as coming from a local subscriber 102 rather than a trunk 116.

The subscriber now dials the called number and dial pulses are repeated by a relay in the register link 107, not only to the register circuit 109 but to a rotary switch called the link marker switch in the link 107. Impulses of the first digit are operative to position both the link marker switch in the register link and the hundreds marker switch in the register. The first digit dialed is the hundreds digit of the local line number or the single code digit for a trunk.

If the hundreds digit designates the same group of 100-lines, in which the calling line is located, three relays are operated which adjust the link 107 to notify the register 109 that, when final selection is to be made, the hundreds digit is not to be sent out and the local link 110, 111 and 112 is selectively operated to connect the calling with the called subscriber's line.

If the hundreds digit designates some other group, e. g. the 300-line group, two of the three relays are operated and the register is notified to transmit the hundreds digit which causes the final selector 112 to hunt for an idle trunk 126 leading to a final selector in the desired hundred line group. The selected final selector, in this example, would be one like 122 and it is then operated to select line 103 in the 300-line group.

If a code is dialed another relay is operated which adjusts the register link 107 to start the line finder 113 of a trunk link 114 and use the final selector 115 to hunt for an idle two-way trunk circuit 116 of the desired group.

All of the final selectors are controlled by the register on a local call. The tens and units digits are not registered in the register link 107 but the above mentioned link marker switch in the link is arranged to move to position 9 after the first digit is dialed and the above operations take place, provided that digit signifies a local line. Provision is made for release when the digit designates an unequipped 100-line group. Thus positions 10 and 11 of the link marker switch absorb the tens and units digits.

As soon as the first digit has been dialed the line finders 106 of the local link 111 or 113 of a trunk line 114 designated by the dialing of the first digit, as above described, is started to seize the calling line. A fourth digit is dialed by the calling subscriber to select the called station in a ten-party ringing system. This moves the link marker switch in the register link 107 to a position for connecting the proper ringing current to the link for ringing the bell of the desired party. When the called subscriber answers, the register link 107 is disconnected and the local link supplies battery for conversation. If the called subscriber's line is busy, busy tone is supplied from the register link 107. The called line is tested by the register 109 which notifies the register link whether or not the called line is idle.

On an inward trunk call the two-way trunk 116 obtains the register link 107 and the dial pulses are recorded as above described. On such calls trunk links 114 will be used on account of the transmission battery supply but the operation is substantially the same as above described.

Reverting calls should be recognized by the calling party line subscriber because he dials his own number followed by the station digit for the desired party on his line. However, a reverting busy tone is sent to the calling party and the link 107 is signalled when the register 109 finds, by test, that the called line is the same as the calling line. A special reverting tone is then connected to the calling subscriber's line and ringing of the called party is controlled in the register link 107. The local link 111 is disconnected when the called party answers and transmission battery is supplied through the line and lockout relays and register link 107 is disconnected.

The attached drawings show the circuits for establishing the connections described above in general terms with reference to Fig. 1. The circuits for the ringing generator, the production of the various tones and the interrupters are shown in Fig. 9 only in sufficient detail to operate with the other detailed circuits. The drawings show the contacts of a given relay related by a fine line to the relay winding which controls them and the first digit of a number designation indicates the figure number showing the apparatus or conductor.

The description is divided into sections and sub-sections to facilitate a clear understanding of the system as follows:

A—Local call to line of same hundreds group—

1. Register link attached
    2. Connection to register
    3. Reception of first digit
    4. Local line finder attached 5. Reception of second and third digits
6. Tens selection
7. Units selection
8. Testing selected line
9. Reception of ringing digit
10. Ringing the called subscriber and answer
11. Release B—Local call to line of different hundreds group—
1. Reception of first digit
2. Selection C—Revertive call—

D—Outgoing call to operator—
1. Attaching a trunk link
2. Trunk selection
3. Operation of two-way trunk
4. Release E—Incoming call from operator—
1. Register link attached
2. Reception of first, second and third digits
3. Selection of called line in same hundreds group
4. Test of called line
5. Called line tests free
6. Called line tests busy
7. Reception of fourth digit and ringing
8. Selection of a called line in a different hundreds group
9. Talking, supervision and release F—Time release—

A—LOCAL CALL TO LINE OF SAME HUNDREDS GROUP

1.—Register link attached

When the subscriber at station 200, Fig. 2, raises his receiver from the switchhook, line relay 202 associated with his line circuit is operated in a circuit from ground, winding of relay 202, break contact of relay 205, line conductors, subscriber's telephone 200, back contacts of relays 205, and 206, non-inductive winding of relay 205 to battery. Relay 202, over its make contact, connects battery through resistance 203, back contact of relay 206, resistance 204 to relay 800 of Fig. 8. A test potential from battery, resistance 203, back contact of relay 206 and front contact of relay 202 is connected to conductor 216.

Figure 3B:
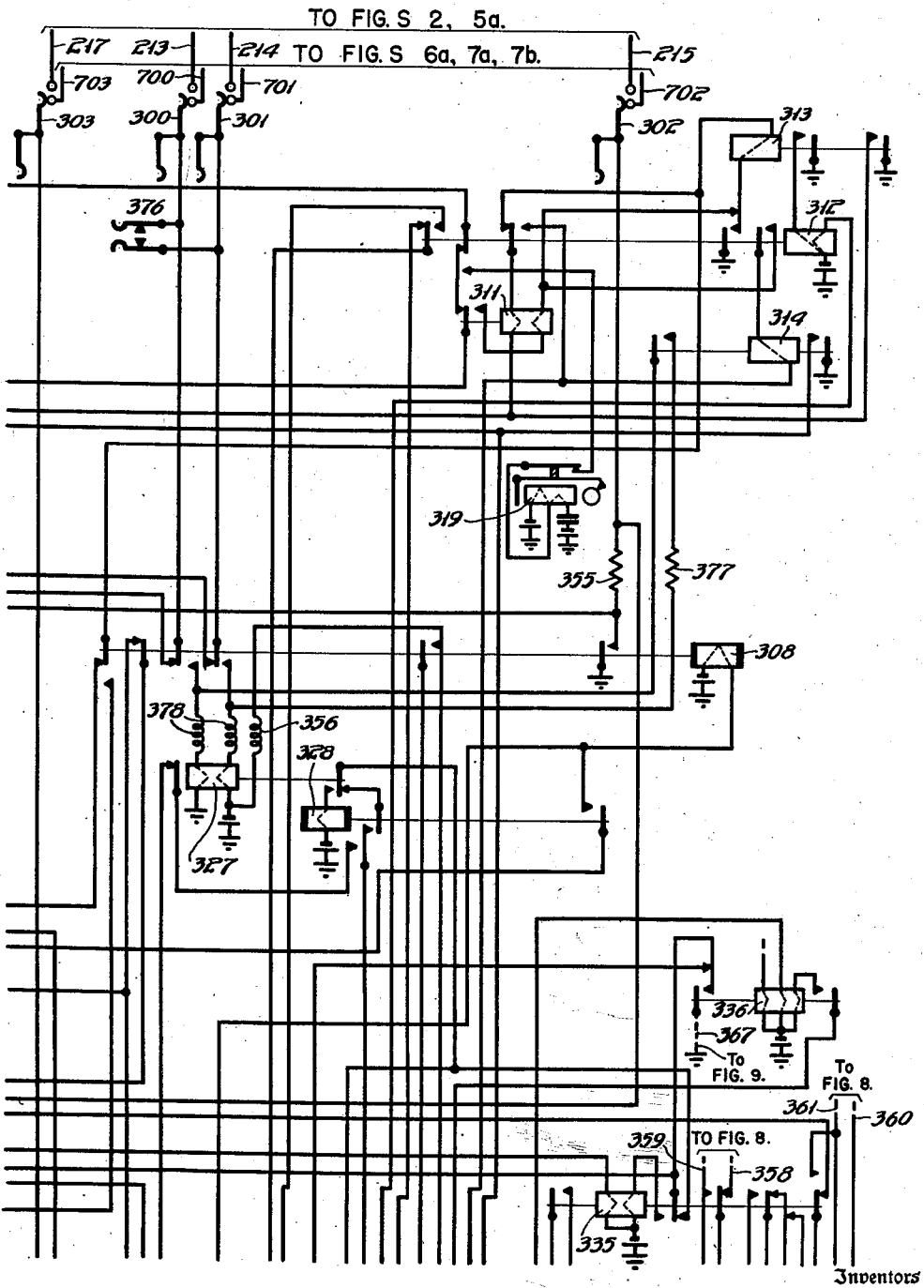
Fig. 3 shows the register link circuit when the five sheets designated as Fig. 3a, 3b, 3c, 3d, 3e are placed together as indicated in Fig. 11.
Figure 3C:
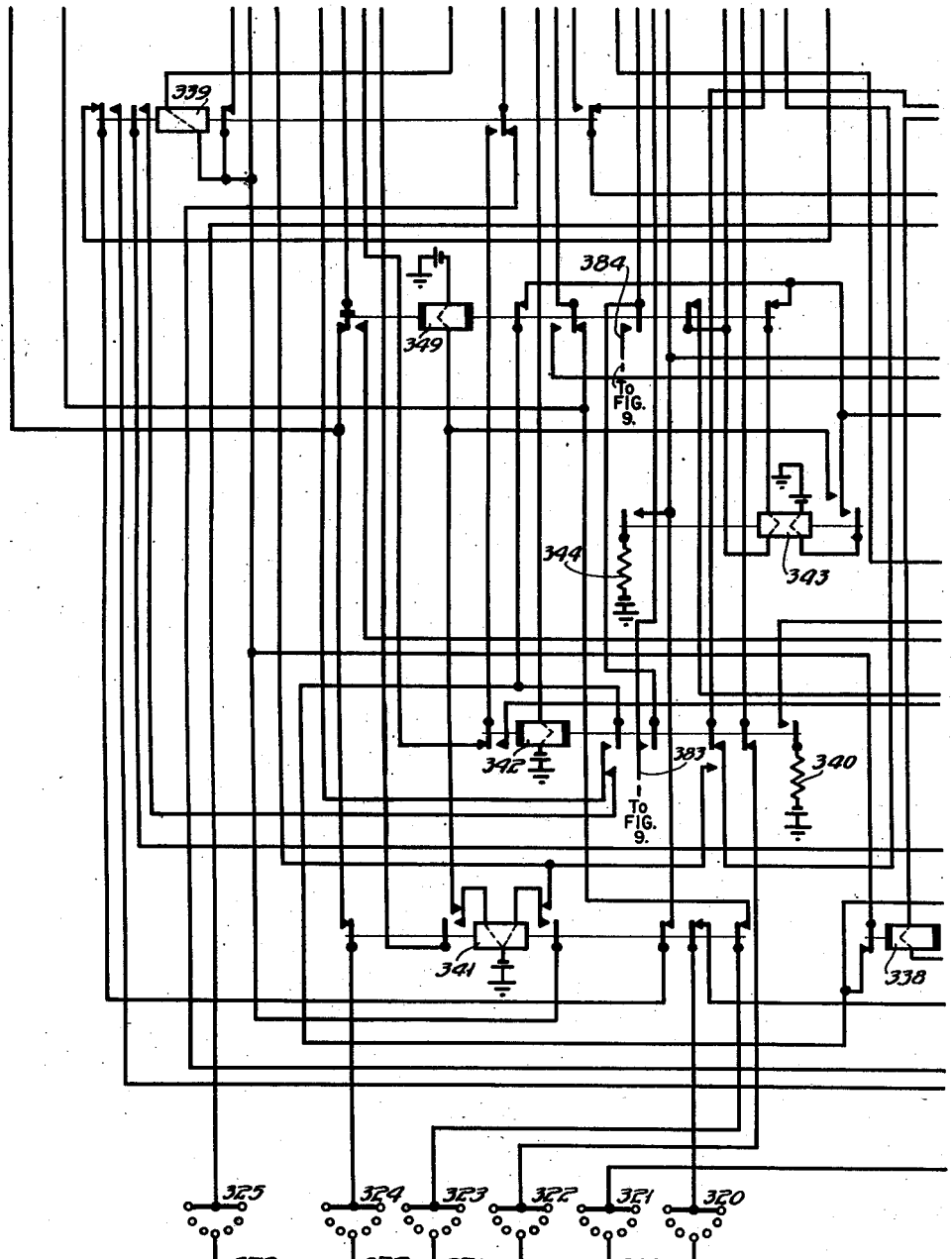
Figure 3D:
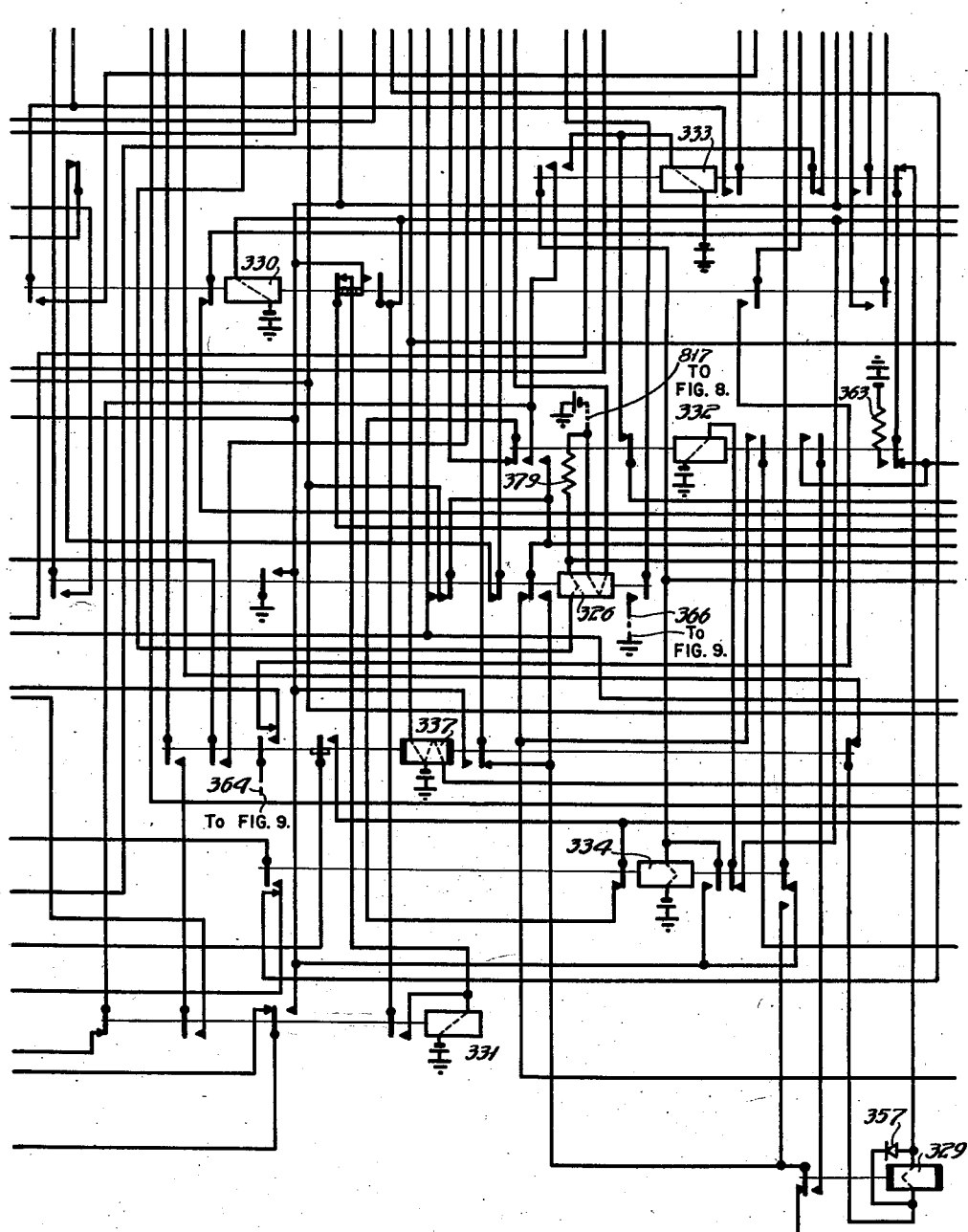
Figure 3E:
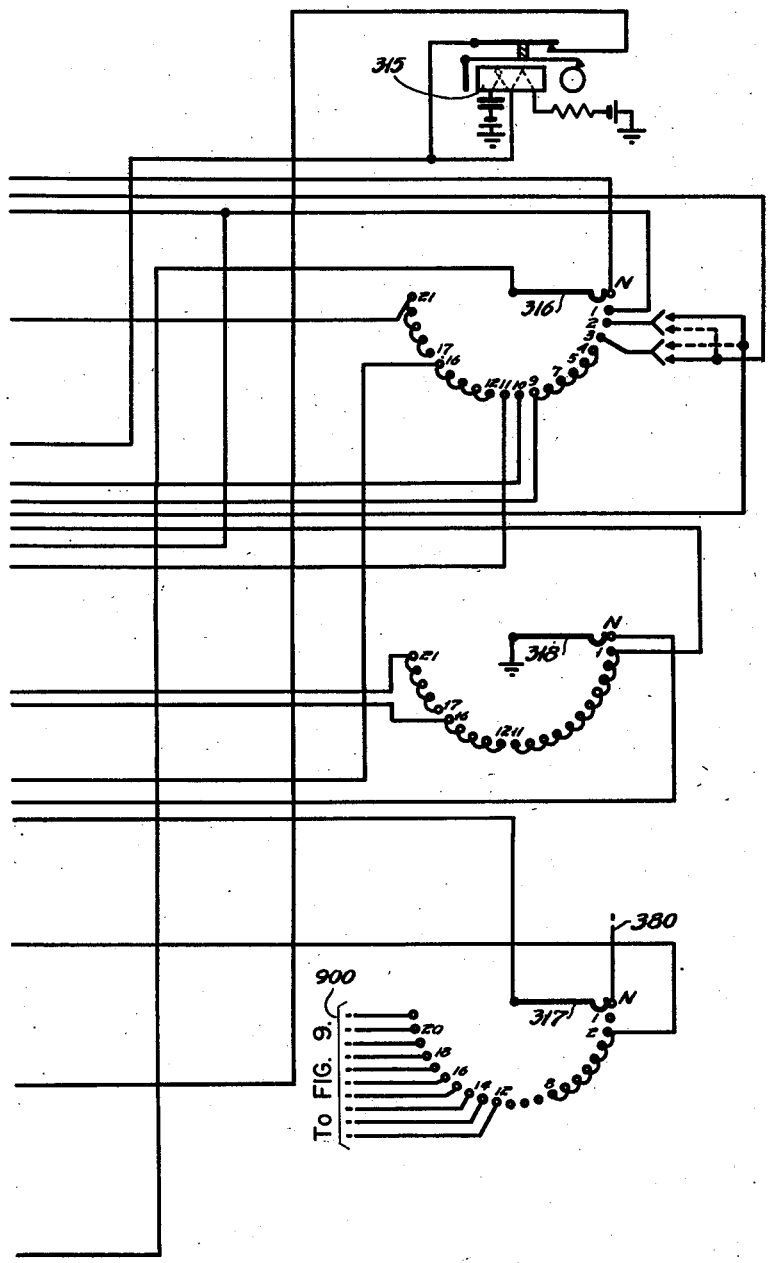

Referring to Fig. 8, relay 800 operates relay 802. Relay 802 operates relay 803 and, via conductor 822 relay 804 closes the circuit over conductor 824 for starting the motor. Relay 803 operates slowly to allow time for the motor to get up to full speed and drive the line finders of the free register links from the terminals on which they are standing to enable succeeding calls on the same line to obtain different line finders. The part of Fig. 8 which includes the relays 800, 801, 802 and 803 is shown in Fig. 3a to show the relationship of these relays to the link circuit. Such a group of relays serves each group of register links.

Relay 802 closes the circuits for the clutch magnets 308 of all free register link line finders, one of which is shown in Fig. 3. This circuit may be traced from battery, winding of magnet 308, contact of relay 802, contact of jack 362, back contact of relays 312, 311, 310, 309 and 308, normal terminal and wiper 318, Fig. 3e, of the link marker switch to ground. All free link line finders rotate, hunting for the calling line. When test potential on conductor 216 is encountered by a brush 306, Fig. 3a, relay 311 operates over its left hand winding in a circuit from battery, resistance 203, back contact of relay 206, front contact of relay 202 (see Fig. 2), conductor 216, brush 306, contact of jack 362, back contacts of relays 346, 308 and 312, left hand winding of relay 311 to ground at a contact of relay 803. The operation of relay 311 releases clutch magnet 308, and connects ground from wiper 318 of the link marker switch, back contacts of relays 308, 309 and 310, front contact of relay 311, right hand winding of relay 311, back contact of relay 312, winding of relay 313 in parallel with the operating winding of relay 311. Relay 313 operates relay 312 which connects ground directly to the winding of relay 313.

The low resistance of the right hand winding of relay 311 and the winding of relay 313 reduces the test potential on conductor 216 to such an extent that no other test relay 311 can operate in parallel with the first relay 311 that operates, and relays 800, 802 and 803 releases, stopping all other line finders. If a double test should occur, i. e. two line finders test the same line at the same time, there is insufficient current to hold both relays 311 or to operate the relay 313. The first relay 311 to release removes its low resistance shunt allowing the other test relay 311 to hold. The former circuit remains normal and waits for the next call.

All the line finder and selector switches in this system are all of the same power driven type. They move seven brushes over seven sets of 100 terminals. The register link line finder starting circuit (Fig. 8) is arranged to start all idle finders searching for a calling line in the group of lines served by the register links and when the line is found by any one of the line finders the remaining line finders are stopped.

2.—Connection to register

When the brush 306 finds the calling line and relay 313 operates, relay 312 operates in an obvious circuit. This releases relay 311 and connects ground from wiper 318 of the link marker switch, back contacts of relays 308, 309, 310 and 311, and a front contact of relay 312 to stepping magnet 319 to cause the register selector to hunt for a free register. Test potential from battery, resistance 403 (see Fig. 4), back contact of relay 400, wipers 406, 409 and 412, in their normal positions, back contact of relay 490, make busy jack 444, conductor 373, when encountered by register selector wiper 325, back contacts of relays 333 and 326, a front contact of relay 312, left hand winding of relay 311, a front contact of relay 313 to ground, operates relay 311. The operation of relay 311 opens the circuit for stepping magnet 319 to stop the register selector. When the double test condition is satisfied as already explained and relay 311 holds, low resistance relay 314 operates.

Relay 314 operates relay 326 and connects resistance 377 across the windings of relay 327 which operates. A front contact of relay 326, supplies ground for operating relay 328 through back contacts of relays 336, 335 and a front contact of relay 327. Relay 328 operates relay 308 from ground, front contact of relay 326, back contacts of relays 335, 333, 338, front contact of relay 328, winding of relay 308 to battery. This ground is extended through the front contact of relay 328 to the left hand winding of relay 326, resistance 379 to lock relay 326. The operation of relay 308 opens the circuit of relay 313 to brush 306 which releases relays 313, 312 and consequently relays 311 and 314. A contact of relay 308 connects ground through resistance 355 to brush 302, conductor 215, a back contact of relay 206 (see Fig. 2) to operate relay 205. This disconnects relay 202 and battery through the non-inductive winding of relay 205 from conductors 213 and 214 and connects relay 202 in series with relay 206 through resistance 207. The operation of relay 206 disconnects battery through resistance 203 from conductor 216 at the link line finder and conductor 212 through resistance 204 to the start circuit (Fig. 8).

Relay 326 completes a circuit from ground, a front contact of relay 326 and a back contact of relay 349, left hand winding of relay 343, back contacts of relays 347 and 342, wiper 322 of the register selector, conductor 370, resistance 401, winding of relay 400 to battery in the register circuit (Fig. 4). Resistance 401 prevents the operation of relay 343 at this time and relay 400 operates. Relay 308 connects the windings of relay 327 through the windings of tone transformer 378, brushes 300 and 301 to line conductors 213 and 214. Dial tone is sent to the calling subscriber by tone coil 378 the primary winding 356 of which is connected to the dial tone transformer shown in Fig. 9, conductor 380, wiper 317 of the link marker switch, through back contacts of relays 334 and 332, and a front contact of relay 308. The system is now ready to receive dial pulses.

3.—Reception of first digit

As previously described, the first digit dialed determines whether a local or trunk link is required and whether or not the called line is in the same group of subscribers' lines as the dialing line. If the local line is one of the same group, group selection in accordance with the first or hundreds digit must be suppressed. If it is a line of some other hundreds group, the final selector associated with the local line finder is used as a group selector and the first digit dialed directs it to an idle trunk to a final selector in the desired hundreds group. In either case a local link is used and the line finder thereof is connected to the calling line by the register link. If the first digit dialed designates an outgoing trunk call, a trunk line is used and the register link receives only the one digit and must be adjusted to selectively operate the final selector associated with the line finder of a trunk link to hunt for an idle trunk and to be satisfied without receiving any subsequent digits.

For the purpose of illustrating the operation of the system as previously described it is assumed that the subscriber 200 makes a call to a subscriber's line in the same 200-line group by dialing line number 2341. Referring to Fig. 3, the connections of relays 331, 330 and 333 to the terminals for wiper 316 are shown in solid lines for the register links serving the 200-line group. Relay 331 is connected through a back contact of relay 330 to terminal 2 and relay 330 is connected to terminal 3. For register links serving the 300-line group, as shown by the dotted lines, relay 331 is connected to terminal 3 and relay 330 to terminal 2. Since hundreds numbers 4 to 9 inclusive are not assigned, these terminals are connected together and to a back contact of relay 330 to short circuit the holding winding of relay 326 which releases. When this occurs the register link is returned to normal and the cutoff relay 205 (see Fig. 2) of the dialing subscriber's line circuit is released. Lockout relay 206 is connected through contacts of relays 202, 206 and 205 to line conductor 214 and relay 202 is connected through a contact of a relay 205 to line conductor 213. These relays remain operated until the subscriber releases and lockout relay 206 connects a guard ground to guard the line from seizure thus locking out the line circuit. Digit "0" designates a trunk call and relay 333 is connected to terminal 10 of wiper 316 through a back contact of relay 332 for this purpose.

The subscriber, upon hearing dial tone, commences to dial the assumed call number 2341. Relay 327 follows the dial pulses. Relay 328 being slow to release, remains operated during the train of impulses representing the digit. Each time relay 327 releases, ground is connected from a front contact of relay 326, back contacts of relays 336, 335 and 327, front contact of relay 328, back contacts of relays 327 and 337, winding of relay 329 in parallel with rectifier 357, back contacts of relays 333 and 332, winding of magnet 315 of the link marker switch to battery. From the double make contacts of relay 328 this ground is also connected through back contacts of relays 334 and 338, wiper 320 of the register selector, conductor 368, back contact of relay 440 in the register circuit, winding of relay 435, and rectifier 436 in parallel, back contact of relay 438 to the winding of magnet 403 of the hundreds marker switch. The link marker switch and the hundreds marker switch in the register follow the dial pulses and take two steps. Wipers 316, 317 and 308 of the link marker switch step to the second terminals.

Relay 329 in series with magnet 315 operates and holds while the pulses are being received. At the end of the first digit, the link marker switch is in position 2 which corresponds to the number dialed. Relay 329 releases and connects ground from wiper 318 terminal 2, a front contact of relay 326, a back contact of relay 329, wiper 316 in position 2, back contact of relay 330, winding of relay 331 to battery. Relay 331 operates and extends this ground to operate relay 330 and through a back contact of relay 334 to operate relay 332. A contact of relay 330 locks the three relays to ground through a front contact of relay 326. The operation of relay 331 connects ground from a contact of relay 326 to wiper 321 of the register selector, conductor 369, resistance 418 (see Fig. 4), back contact of relay 445, front contact of relay 443 to operate relay 431 in the register, which cancels group selection when relay 443 operates after the hundreds marker switch has been positioned. The operation of relay 332 completes a circuit from ground, wiper 318 of the register selector, a front contact of relay 332, back contact of relay 334, wiper 317 and a front contact of relay 332 to the interrupter contact of magnet 315 to step the link marker switch to position 9 as determined by wiper 317 by self-interruption.

As previously stated, the release of relay 327 sends a pulse over register wiper 320 of the register selector and conductor 368 to operate magnet 403 in series with relay 435 and a back contact of relay 438 in the register. The two pulses for the hundreds digit are recorded on the hundreds marker switch. Relay 435 operates on the first impulse and holds for the duration of the digit. When relay 435 releases at the end of the pulses, ground from a back contact of relay 437, interrupter contact of magnet 403 of the hundreds marker switch, back contacts of relays 435 and 443, wiper 408 of the hundreds marker switch, a front contact of relay 400, normally closed contact and winding of relay 438 to battery, operates relay 438 which locks to a contact of relay 400. Relay 438 transfers the instepping circuit including series relay 435 from magnet 403 to 404 via a back contact of relay 439 and operates relay 443 to open the restoring circuit for the hundreds marker switch and prepares for the operation of relay 429 so as to allow selection to start immediately after the reception of the first digit, if required. This operation is coincident with the stepping of the link marker switch.

4.—Local line finder attached

When relay 330 operates, ground is connected to the start wire 358 to operate relay 805 of the start circuit (Fig. 8) from battery, resistance 812, back contacts of relays 806, 805 and 807, winding of relay 805, conductor 358, back contact of relay 335, front contact of relay 330, back contacts of relays 346, 339, 338, 333 and 335, and front contact of relay 326 to ground. Referring to Fig. 8, it will be noted that the starting relays 805 and 806 are arranged to prevent both relays from being operated at the same time and that when one is operated the other is prevented from operating by relay 807. Relays 808 and 810 operate. The operation of relay 808 connects battery through resistance 814 to provide test potential. This circuit is continued through a contact of relay 808, conductor 360, front contact of relay 330, back contacts of relays 335, 339, 341 and 346, brush 305, of the link line finder to conductor 219. This applies test potential to the corresponding terminals of the line finders of the local links. The operation of relay 810 connects ground to conductor 547, line finder off normal contact 548, back contact of relays 531 and 534, normally closed contacts of jack 549, winding of line finder clutch magnet 507 to battery.

One start circuit is provided for five register links and relay 808 connects five resistances 814 to the five conductors 360 of the links. Relay 810 connects ground to all the local line finders of the group. Thus all the local line finders, which are of 100 lines capacity and similar to the link line finders, that are idle, are started and hunt for the test potential applied to conductor 219 by brush 305 of the register link line finder. Conductor 219 is connected to the terminals over which the brushes 506, of the local line finders, move.

When brush 506 encounters the test potential, relay 531 is operated in a circuit from ground, back contacts of relays 540 and 524, contact of jack 549, left hand winding of relay 531, back contact of relay 534 to brush 506. Relay 531 operates and opens the clutch magnet 507 to stop the line finder. The start ground is then connected through a front contact of relay 531, winding of relay 532, right hand winding of relay 531 to the test circuit. This forms the double test circuit and, as previously stated, relay 531 will not hold when two or more are connected to the same test potential. One of them will release before the other and the one that releases first stops the line finder but does not connect through. The one that holds connects through and relay 532 is operated to operate relay 533 which locks to ground via conductor 216 and brush 505, the ground on conductor 216 being traced from ground, a front contact of relay 326, back contacts of relays 335, 333 and 338, winding of relay 339, front contact of relay 308, back contact of relay 346, contact of jack 362, brush 306 of the link line finder to conductor 216.

Relay 339 operates and opens the starting conductor 358 which releases relay 805 (see Fig. 8) and consequently relay 808 releases and the test potential is removed from conductors 360 and 219. The operation of relay 534 from a contact of relay 533 transfers line finder brush 506 from relays 531 and 532 to prepare for connecting to selector brush 515 via contacts of relays 539 and 530. While relay 532 is operated it closes a circuit from line finder brush 504 to operate relay 530 if group selection is required. Relay 530 locks to a ground at a contact of relay 534. Relays 531 and 532 release. The release of relay 532 prevents the locking ground for relay 530 from feeding back into the register link. Relay 534 opens the circuit to the line finder clutch magnet 507 to prevent the line finder from moving when test relay 431 releases and provides a holding ground for the link circuit.

5.—Reception of second and third digits

The calling subscriber proceeds to dial the tens and units digits while the line finder of the local link is being attached. The digits are recorded on the tens and units marker switches in the register and the link marker switch takes one step for each digit.

When the subscriber dials the tens digit, relay 327 releases three times. Relay 329 operates in the previously described circuit to battery through resistance 364 and a contact of relay 332 and holds for the duration of the pulses. When relay 329 operates, ground from wiper 318 of the link marker switch, front contacts of relays 326 and 329 operates the link marker switch magnet 315. When relay 329 releases, the magnet releases and steps the link marker switch to position 10.

In the register, the instepping circuit from the contacts of relay 327 via wiper 320 of the register selector and conductor 368 operates relay 435 on the first impulse and by the operation and release of magnet 404, steps the tens marker switch to position 3. When the pulses cease, relay 435 releases, it completes a circuit from ground, a back contact of relay 437, interrupter contact magnet 403, a back contact of relay 435, front contact of relay 443 and back contact of relay 439, wiper 411, a front contact of relay 443 and a back contact and winding of relay 439 to battery, to operate relay 439 which locks to ground from a contact of relay 400, and transfers the instepping circuit to magnet 405 of the units marker switch.

The units digit is received in the same manner as the tens digit with the link marker switch stepping to position 11 and the units marker switch to position 4. When magnet 315 releases, ground via wiper 316 of the link marker switch in position 11 operates relay 334 which disconnects the instepping circuit from the register. Relay 332 releases to reconnect the link marker switch magnet to relay 327.

When relay 435 in the instepping circuit of the register releases at the end of the units pulses, relay 432 operates via brush 414 of the units marker switch and locks to ground from a contact of relay 400 to prepare the register circuit for units selection.

6.—Tens selection

After reception of the first digit, the register link connects ground to wiper 321 of the register selector to operate relay 431 as described in section A-3. Relay 431 opens the circuit of revertive pulse relay 429 and the control ground to conductor 371 and wiper 322 of the register selector to prevent the operation of the final selector, removes ground from terminal 12 of brush 408 of the hundreds marker switch, and completes a circuit from ground, interrupter contact of magnet 404, front contact of relay 437, interrupter contact of magnet 403, front contacts of relays 438 and 431, wiper 408 of the hundreds marker switch, front contact of relay 431, back contact of relay 415, winding of magnet 403 to battery, to self-step the hundreds marker switch to position 12. This cancels the hundreds selection and prepares the circuit for tens selection. Relay 431 remains operated for sufficient time to insure the stepping of the hundreds marker switch.

The revertive impulse control circuit is now closed from ground, a front contact of relay 400, wiper 406 and terminal 12 of the hundreds marker switch, front contact of relay 437, wiper 409, of the tens marker switch in position 3, back contact of relay 431, front contact of relay 443, back contact of relay 445, conductor 371, wiper 323 of the register selector, back contacts of relays 341, 349 and 346, front contacts of relays 339 and 326, brush 303 of the link line finder, conductor 217, line finder brush 503 of the local link, front contact of relay 533, back contact 539, offnormal contact 526, winding of relay 525 to battery. Relay 525 operates and extends this ground to the selector clutch magnet 517. Magnet 517 operates contacts 526 and 527 and causes the selector to rotate. Battery is supplied to the selector clutch magnet 517 through the winding of relay 819 (see Fig. 8) via conductor 816 to operate relay 819 which, in turn, operates relay 804 to maintain ground on the motor start circuit. Offnormal contact 526 closes a holding circuit for relay 525 and magnet 517 and offnormal contact 526 opens the starting circuit for relay 525. Offnormal contact 527 opens a circuit to relay 537 before offnormal contact 528 closes to prevent the premature operation of relay 537. Selector offnormal contact 548 opens the starting conductor 547 to prevent starting the line finder once a call is in progress.

The numbering of the terminals in the selector banks for both the local and trunk links is shown on Fig. 10. These banks provide 51 positions including the normal position. As the brushes revolve, one set of brushes contacts with one set of terminals on the first half revolution and the other set of brushes contacts with the other set of terminals on the second half revolution. The bank terminals are, in effect, divided into two halves; an upper half, to which the subscriber's lines and incoming trunks are connected, and the lower half, to which the two-way outgoing trunks and the trunks to other hundreds groups are connected. The test terminals are located between two halves. It will be noted that the terminals are numbered down beginning at the left, or with the movement of the brushes. This numbering arrangement makes it possible to step the wipers of the digits marker switches forward a number of steps which is the tens complement of the position, in which the wipers are set by the dial pulses, i. e., the digit dialed.

For example, if a number 3 is recorded by dial pulses on one of the digits marker switches the switch will then take 7 steps under control of the revertive impulse circuit which will drive the brushes of the selector, as shown on Fig. 10, to the terminals numbered 3. More specifically, a brush identified as 516—616 is driven over the 0, 9, 8, 7, 6, trunk groups and the mate brush 516'—616' is driven over the 5 and 4 trunk groups to the first terminal of trunk group 3. Similarly, in the case of a line, the brush is driven to the terminal by a number of steps which is the tens complement of the terminal. Thus, brush 510'—610', if line 53 is to be selected, is driven 7 positions to line terminal 53 having been brought to rest on terminal 50 by the tens selection.

As the selector brushes rotate, ground from contacts 1, 11, 21, etc., brush 516, back contacts of relays 536, 539 and 524, a front contact of relay 533, local line finder brush 504, conductor 218, link line finder brush 304, front contact of relay 339, back contacts of relays 342, 346, 349 and 341, wiper 324 of the register selector, conductor 372, back contacts of relays 445 and 430, winding of relays 429, back contacts of relays 430, 431, a front contact of relay 443, resistance 442 to battery, operates relay 429 of the register circuit. Ground from the front contact of relay 429 operates magnet 404 of the tens marker switch via a back contact of relays 415, wiper 407 position 12 of the hundreds marker switch, front contact of relay 437, magnet 404 to battery. Relay 433 is also operated in this circuit and locks from ground, interrupter contact of magnet 404, front contact of relay 437, interrupter contact of magnet 403 and front contacts of relays 438 and 433 to insure that magnet 404 will take one step for each revertive pulse, however short, is received.

In this illustration the tens marker switch was set in position 3 by the dial pulses. When the tens marker switch reaches position 10 after taking 7 steps, ground from a contact of relay 400, wiper 406 of the hundreds marker switch position 12, a front contact of relay 437, wiper 409 of the tens marker switch position 10, winding of relay 428 to battery, operates relay 428. At this time brush 516' is moving from group 4 to group 3, i. e., from test terminal 61 to 71 (see Fig. 10). Ground is maintained on the fundamental circuit over conductor 371 at the back contact of relay 429 to hold relay 525 and magnet 517 in the local link. On the next operation of relay 429, magnet 404 is energized and relay 416 is operated through a front contact of relay 428 and a back contact of relay 415. Relay 525 and magnet 517 release and stop the selector brushes at test terminal 71 corresponding to line terminal 30. Relay 445 operates from a contact of relay 415 and opens the circuit from wiper 324 via conductor 371 of the register selector to release relay 429. The release of relay 429 de-energizes magnet 404 stepping the tens marker switch to position 11 and opens the circuit for relay 416. When the tens marker switch steps to position 11, relay 428 is released and a short time later relays 416 and 415 release in turn. The register circuit is then prepared for units selection.

7.—Units selection

When an odd number is dialed for the units digit, the units marker switch is stepped to an odd numbered position, ground from a contact of relay 400, wiper 406 position 12 of the hundreds marker switch, front contact of relay 437, wiper 410 position 11 of the tens marker switch, front contact of relay 432, wiper 412 of the units marker switch operates relay 430 which locks to ground at a contact of relay 400. Relay 430 transfers the operating circuit for relay 429 to respond to revertive battery pulses for odd numbered units digit selection. For even numbered units digits, relay 430 does not operate and relay 429 responds to revertive ground pulses.

The release of relay 445 at the end of tens selection again connects ground to wiper 323 of the register selector and in this example responds to revertive ground pulses since the units digit dialed is "4" and the units marker switch is in position 4.

The revertive impulse control circuit is now closed over the previously described circuit from ground front contact of relay 400, wiper 406 of the hundreds marker switch position 12, front contact of relay 437, wiper 409 of the tens marker switch position 11, back contacts of relays 440 and 431, front contact of relay 443, back contact of relay 445, conductor 371, wiper 323 of the register selector, back contacts of relays 341, 349 and 346, front contacts of relays 339, 326, brush 303 of the link line finder, conductor 217, brush 503 of the local line finder, front contact of relay 523, back contact of relay 539, off-normal contact 526 to operate relay 525. Clutch magnet 517 is then operated to rotate the selector brushes. A contact of relay 525 operates relay 537 before interrupter contact 527 opens. Relay 537 locks to ground via a back contact of relay 536 and a front contact of relay 525. Relay 537 short circuits relay 536 to prevent its operation until the proper line has been selected and connects ground to terminals 3, 5, 7 and 9 for brush 516 via a back contact of relay 530, terminals 1, 11, 21, etc. being permanently connected to ground.

As the selector rotates, the revertive battery pulses, in this example, through resistance 546, terminals 2, 4 and 6, selector brush 516, back contacts of relays 536, 539 and 524, front contact of relay 533, local line finder brush 504, conductor 218, brush 304 of the link line finder, front contact of relay 339, back contacts of relays 342, 346, 349 and 341, wiper 324 of the register selector, conductor 372, back contacts of relays 445 and 430, winding of relay 429, back contacts of relays 430 and 431, front contact of relay 443, resistance 442 to battery, operate relay 429. The tens marker switch is again stepped by relay 429 until relay 440 is operated. Magnet 404 operates from ground, front contact of relay 429 and back contact of relay 415, wiper 407 in position 12 of the hundreds marker switch, front contact of relay 437, magnet 404 to battery. Relay 440 operates from ground, a front contact of relay 400, wiper 406 in position 12 of the hundreds marker switch, front contact of relay 437, wiper 410 in position 14, in this example, of the tens marker switch, wiper 413 in position 4 of the units marker switch, winding of relay 440 to battery. The operation of relay 440 connects ground, front contact of relay 400, wiper 406 position 12, front contact of relay 437, wiper 409 positions 11–15, a front contact of relay 440, to operate relay 428 and places the fundamental ground under control of relay 429 because ground remains connected to conductor 371 from back contacts of relays 429 and 431 and a front contact of relay 443. Ground from front contacts of relays 400 and 440 and a back contact of relay 416 operates relay 417 which connects ground via back contacts of relays 419 and 426 to the winding of slow operating relay 424. The next operation of relay 429 from ground on brush 516 of the selector removes ground from conductor 371 to release relay 525 and magnet 517 and stop the selector. Relay 429 operates relay 416 via a front contact of relay 428. Relay 416 operates relay 445 in an obvious circuit and releases relay 429, closes a circuit from ground, winding of relay 422, back contacts of relays 420 and 419, front contacts of relays 440 and 445 to conductor 372 for testing the busy or idle condition of the called subscriber's line, and connects ground via resistance 441 and front contacts of relays 440 and 445 to conductor 371 for operating relay 525 but not magnet 517 of the final selector. Relay 445 locks to ground at a front contact of relay 417. The release of relay 429 releases relay 416.

When relay 525 releases, the holding circuit of relay 537 and the short circuit of relay 536 is removed and relay 536 operates in series with relay 537 which remains operated from ground at a contact of relay 524. Relay 536 opens part of the ringing circuit to prevent premature application ringing current, transfers brush 504 of the finder to brush 512 of the selector to allow the register to test the dialed line, closes a circuit to relay 537 in series with both windings of relay 536, opens the starting circuit for relay 537 to prevent its reoperation when relay 525 reoperates, and prepares part of the starting circuit to relay 539.

As previously described when units selection was completed by the register, ground through resistance 441 was connected to wiper 323 of the register selector and through the register link to brush 503 of the local line finder to mark the end of selection. The resistance is such that relay 525 operates and clutch magnet 528, having restored, does not operate. Relay 525 closes a holding circuit tto relay 536 over the winding which is permanently connected to battery and short circuits the winding of relay 537 causing it to release and, in turn, closes the starting circuit to relay 539 which locks to ground from a contact of relay 534.

Relay 539 transfers the circuit between finder brush 504 and selector brush 512 from the contacts of relay 536 to the contacts of relay 539 and prepares a circuit to relay 535 from brush 506 of the finder for the reception of the line free signal.

8.—Testing selected line

When the final selector arrives at the terminals of a free non-P. B. X line, cutoff relay 205 is connected to relay 442 of the register via conductor 226, final selector brush 512 and finder brush 504 of the local link, conductor 218, finder brush 304 of the register link, wiper 324 of the register selector, conductor 372, front contacts of relays 445, 440, a back contact of relay 419 and winding of relay 422 to ground. Relays 205 and 422 operate in series. Relay 205 disconnects line relay 202 and the non-inductive winding of relay 205 from line conductors 124 and 125 and connects relay 206 to relay 202. Relays 202 and 206 operate but have no useful purpose at this time.

As previously described, when relay 417 in the register circuit was operated at the end of units selection, a circuit was closed for the slow operating relay 424. The operation of relay 422 operates relays 423 and 420 in turn. When relay 424 operates after a time, resistance 401 is short circuited to operate relay 343 in the register link circuit when the ground shunt is removed by the operation of relay 337 and by the pickup interrupter which connects ground via conductor 364, and a back contact of relay 349. Relay 343 locks to ground from a contact of relay 326 and operates relay 341 and 349. Relay 349 opens the circuit to relay 400 of the register circuit which restores.

If the called line is a busy individual or party line, the cutoff relay 205 is held operated by a resistance ground which prevents relay 422 from operating so that when the slow operating relay 424 finally operates, ground is connected from back contacts of relays 426 and 420, front contacts of relays 424 and 440, conductor 368, wiper 320 of the register selector, back contact of relay 341, front contacts of relays 334 and 339, back contacts of relays 342 and 347, winding of relay 342 to battery in the register link circuit. Relay 342 operates to record the busy condition and to open the circuit to the holding relay 400 via wiper 322 causing the register circuit to restore.

When relay 400 releases the general holding ground for the register is removed and all relays release. The units marker switch is restored to normal from ground, interrupter contact of magnet 405, a back contact of relay 438, wiper 414, a back contact of relay 437, winding of magnet 405 to battery. The units marker switch self-steps until the wipers are in their normal position when this circuit is opened. The tens marker switch restores from ground, interrupter contact of magnet 404, back contacts of relays 437 and 438, wiper 411, back contact of relay 443, winding of magnet 404 to battery. The magnet self-steps in this circuit until the wipers are restored to normal. The hundreds marker switch restores in a circuit from ground, back contact of relay 437, interrupter contacts of magnet 403, back contacts of relays 438 and 400, wiper 408, back contact of relay 400, winding of magnet 403 to battery. The magnet 403 self-steps the wipers to normal in this circuit. When wipers 406, 409 and 412 are normal the condition for hunting is established from battery, resistance 403, wipers 406, 409 and 412 in their normal positions, back contact of relay 400, contact of jack 444, to conductor 373. Until this circuit is restored the register is unavailable.

If the called line is the first line of a P. B. X group, and is busy, the inductive winding of the cutoff relay 205 is shunted by resistance 209. When the held line is busy because of a resistance connected to ground in a local or trunk link, there will be sufficient test potential to operate relay 422 and relays 423 and 420 operate in turn. Relay 420 removes the short circuit on resistance 421, causing relay 422 to release. The release of relay 422 connects ground, contacts of relays 429, 422, front contacts of relay 420 and a back contact of relay 426, winding of relay 419 to battery and releases relays 423 and 420. The operation of relay 419 opens the operating circuit of relay 424. The release of relay 420 operates relay 426 from a contact of relay 419. Relay 426 connects direct ground to relay 525 and clutch magnet 517 of the local link circuit via back contacts of relays 429, 422 and 420, a front contact of relay 426, back contact of relay 427, front contacts of relays 440 and 445, conductor 371, wiper 323 of the register selector, through the register link circuit, brush 303 of the register link line finder, conductor 217, brush 503 of the local line finder and a contact of relay 533 to operate relay 525 in the local link.

When a free P. B. X line is encountered, relay 422 operates via conductor 372, wiper 324 of the register selector and brush 512 of the selector in the previously described circuit, operates relays 423 and 420 and opens the ground circuit to relay 525 and clutch magnet 517 of the selector. The operation of relay 420 closes the operating circuit for relay 424, via relays 426 and 417. When relay 424 operates, a free line signal is sent to the register link and the register is restored as previously described.

If no line of the P. B. X group is free, sufficient test potential is connected to wiper 324 of the register selector, when the last line of the group is reached, to operate relay 422 because the cutoff relay 205 of the last line of a P. B. X group is shunted by a resistance 209 in the same manner as the first line of the group. Relays 423 and 420 operate in turn and, if the line is busy, relay 422 releases when the operation of relay 420 inserts resistance 421 in series with the winding of relay 422. The operating circuit for relay 424 is completed by relay 429. Relay 427 then operates from ground via, contacts of relays, back contacts of relays 429 and 422 and front contacts of relays 420 and 426. Relays 423 and 420 release after a short delay. The operation of relay 427 closes the operating circuit of relay 424. The operation of relay 424 connects ground via front contacts of relays 427, 424 and 440, conductor 368 to wiper 320 of the register selector to signal to the register link that all P. B. X lines are busy.

When a line busy signal is received in the register link by ground via wiper 320 of the register selector, relay 342 operates as previously described and locks to ground via a back contact of relay 349 and a front contact of relay 326. Relay 342 opens the register holding circuit via wiper 322 of the register selector thereby releasing the register, operates relay 341 which opens connections to the register and connects relay 348 to brush 304 of the link line finder via front contacts of relays 337, 331, 342 and 339. Relay 348 operates in parallel with the grounded resistance of the local or trunk link. In the register link circuit that receives the line busy signal, relay 348 connected to link line finder brush 304 as previously described, is connected via conductor 218, local line finder brush 504, front contact of relay 533, a back contact of relay 524, front contact of relay 539 and back contact of relay 530 to brush 512 which, at that time, is connected to conductor 226. Relay 347 operates via front contacts of relays 348 and 342, back contact of relay 349 and front contact of relay 326 to ground and locks. Since this is not a revertive call relay 348 remains operated. Relay 342 releases slowly from a contact of relay 341. Busy tone is sent to the calling subscriber via the primary winding 356 of tone coil 378. The busy tone is supplied from the busy tone transformer shown in Fig. 9, conductor 383, a back contact of relay 309, front contacts of relays 347 and 337 to the winding 356. The circuit holds until the subscriber releases. When that occurs, relay 327 releases, releasing in turn relay 328. Relays 326 and 308 release removing the general holding ground. The marker switch restores from ground, wiper 318, back contacts of relay 326, interrupter contact and winding of magnet 315 to battery after relay 326 releases leaving the register link circuit normal.

9.—Reception of ringing digit

After the units digit has been recorded as described in section A–5, the ringing digit is recorded only in the register link in the same manner as for the hundreds digit as described in section A-3 except that the link marker switch starts from position 11. This operation of the link marker switch proceeds while the register is selecting and testing the called line as described in sections A-6, A-7 and A-8. Relay 329 operates and holds during the series of impulses. The link marker switch steps to a position from 12 to 22 depending on the number dialed. This provides for lines with a maximum of ten parties and full selective ringing. Five ringing frequencies are used with connection to either line wire 224 or 225 to give full selective ringing.

After the digit is received, relay 329 releases, operating relays 337 or both relays 337 and 312 via brush 316. Relay 337 operates for all codes. Relay 312 operates for codes 6 to 10 to transfer ringing current from line wire 225 to line wire 224. Link line finder brush 304 is connected via conductor 218 to local line finder brush 504 and front contacts of relays 533 and 524, back contacts of relays 519 and 530 to selector brush 511 and line conductor 225. Link line finder brush 303 is connected via conductor 217, local line finder brush 503, front contacts of relays 533 and 539, back contacts of relays 536, 519 and 530 to selector brush 510 and line conductor 224.

Ringing current from the harmonic ringing generator indicated on Fig. 9, conductors 900, wiper 317 of the link marker switch, front contact of relay 337, winding of relay 338, contact of relay 312, and when the relay is not operated through a back contact of that relay, a front contact of relay 349, back contact of relay 346, a back contact of relay 342, a front contact of relay 339 to link line finder brush 304. When relay 312 is operated the winding of relay 338 is then connected via a front contact of relay 312, a front contact of relay 349, a back contact of relay 346, front contacts of relays 339 and 326 to link line finder brush 303. The ground return for the ringing circuit may be traced through wiper 318 of the link marker switch positions 12 to 21 which connects ground to link line finder brushes 304 or 303 depending upon the position of the switch. For example, when relay 312 is operated wiper 318 is in a position from 17 to 21 and ground is then connected over the front contact of relay 349 to brush 304, the ringing current from wiper 317 being at that time connected in series with the winding of relay 338 to link line finder brush 303. The circuit waits until selection is complete and a line free or line busy signal is received from the register as described in section A-8.

The following table will clarify the ringing conditions of the 10-party harmonic ringing system.

| Party | Ringing Frequency | Relays Operated | Line Wire |
|---|---|---|---|
| 1 | 33 | 337 | 225 |
| 2 | 50 | 337 | 225 |
| 3 | 66 | 337 | 225 |
| 4 | 16 | 337 | 225 |
| 5 | 25 | 337 | 225 |
| 6 | 33 | 337 and 312 | 224 |
| 7 | 50 | 337 and 312 | 224 |
| 8 | 66 | 337 and 312 | 224 |
| 9 | 16 | 337 and 312 | 224 |
| 10 | 25 | 337 and 312 | 224 |

*10. Ringing the called subscriber and answer*

As described in section A-8, if the called line tests free, the register sends a line free signal to the register link and relay 343 operates when ground is removed from the pickup conductor 364 at the beginning of the ringing period. This allows relay 343 to operate at the proper time for code ringing, if used, so that the correct number of rings is sent out when ringing first starts.

Relay 343 operates relays 349 and 341 and connects battery through resistance 344, a front contact of relay 343 and a back contact of relay 346 to link line finder brush 305, conductor 219, local line finder brush 506, front contacts of relays 537 and 539, winding of relay 535 to ground. Relay 535 operates relay 524 in the local link circuit.

Relay 524 prepares a circuit from ground, a front contact of relay 524, back contact of relay 540, resistance 522, back contact of relay 533, line finder brush 502, to conductor 215 of the calling line circuit for holding cutoff relay 205 of the dialing subscriber's line. Relay 524 also connects ground through resistance 523, a front contact of relay 539 and a back contact of relay 530 through selector brush 512 to line conductor 226 for holding the called subscriber's line. Relay 524 also opens part of the homing circuit for the selector clutch magnet 517, closes a multiple holding circuit to relay 539, prepares part of the ringing circuit from finder brush 504, prepares part of a circuit to relay 519 and prevents the reoperation of relay 531 from a potential on brush 506 of the line finder.

Relay 343 of the register link circuit opens the circuit to wiper 322 of the register marker switch, releasing the register. Relay 349 connects the ringing trip relay 338 to the appropriate side of the line; and connects ringing tone from a transformer shown on Fig. 9, conductor 384, front contact of relay 349, back contact of relay 347, front contact of relay 326, primary winding 356 of tone coil 378 to the calling line.

When the called subscriber answers, the line loop is closed, operating the ringing trip relay 338 from battery in the ringing source and ground on brush 318 of the link marker switch. Relay 338 releases relays 308 and 326. Relay 308 removes the general holding ground for the register link and the remaining relays release. The link marker switch is self-stepped to normal from ground, wiper 318, back contacts of relay 326, interrupter contact of winding of magnet 315 to battery, thereby returning the register link to normal until another call is originated.

When ringing is tripped, the register link opens the circuit to relay 533 via brush 306 of the link line finder, conductor 216, brush 505 of the local line finder and releases relay 533 of the local link. The line free signal via brush 305 of the link line finder, conductor 219 and brush 506 of the local line finder releases relay 535. Relay 535 opens the circuit to slow release relay 524.

Relay 533 closes the circuit for holding the dialing subscribers line, opens part of the circuits to brushes 503 and 504 of the local line finder and releases relay 534. Relay 534 closes part of the homing circuit for selector clutch magnet 517, opens a multiple holding circuit for relay 539, closes a circuit to relay 519 and prepares connections in the local link for using the line finder on the next call.

Relay 519 connects brushes 500 and 501 to the windings of relay 508 via contacts of relay 518, transfers brushes 510 and 511 of the selector from brushes 503 and 504 of the line finder to the windings of relay 509 and closes the motor holding circuit over conductor 815.

The windings of relays 508 and 509 and condensers 520 and 521 provide the transmission circuit.

Relay 508 connects ground to relay 524 before it restores to prevent the release of the connection until the dialing subscriber disconnects.

Relay 509 closes the circuit to relay 518 which reverses battery over brushes 500 and 501 of the line finder to cause coin disposal when the call is from a pay station line.

11. Release

If the called subscriber disconnects first, the circuit to relay 509 via brushes 510 and 511 of the selector is opened, causing relay 509 to restore and release relay 518.

When the calling subscriber disconnects, the circuit to relay 508 via brushes 500 and 501 of the local line finder is opened causing relay 508 to restore and release relay 524, which in turn releases relays 519 and 539, removes ground via resistance 522 and 523 from brush 502 of the finder and brush 512 of the selector to free the called and calling lines and closes a homing circuit for the selector.

Relay 519 restores, releases relay 509 if not already released and prepares connections for using the local link on another call.

While the selector is returning to its normal position, battery through relay 819 of the starting circuit (Fig. 8) via conductor 816 operates relay 819 to maintain relay 804 operated when ground is removed from conductor 815 by the release of relay 519. When the selector returns to its normal position, the selector clutch offnormal springs 548 reconnect conductor 547 to prepare a circuit to the finder clutch magnet 507 and via, offnormal springs 541, to prepare a circuit for relay 540 so that the local link may be used on another call.

B—LOCAL CALL TO LINE OF DIFFERENT HUNDREDS GROUP

When the subscriber at station 200 wishes to call a subscriber in a different hundreds group, the operations described in section A-1 and A-2 attach a register link to the calling line and a register to the link and the system is now ready to receive dial pulses. It is assumed that line number 3341 is called.

1. Reception of first digit

As described in section A-3 the dial pulses step the link marker switch in the register link circuit and the hundreds marker switch in the register to their position 3. When relay 329 releases, relays 330 and 332 operate via wiper 316 of the link marker switch. Relay 331 is not operated indicating that the call is for a line in a different group and relay 431 of the register circuit is not operated at this time. A local link is attached as described in section A-4. When it is attached and before relay 339 operates, ground from wiper 318 of the link marker switch, front contacts of relays 332, back contacts of relays 331 and 339, brush 304 of the link line finder, conductor 218, brush 504 of the local link line finder, a front contact of relay 532 operates relay 530 which locks to a contact of relay 534. The operation of relay 530 transfers the link circuit conductors from brushes 510 and 511 to brushes 513 and 514, opens the circuit to brush 512 and connects brush 515 to the link circuit, thus utilizing the terminals of the lower half of the selector arc. A holding circuit for relay 530 is closed to itself from a contact of relay 534, the contacts of relay 537 through which the starting circuit is prepared are short circuited and the circuit which is used to place ground on the odd numbered terminals of brush 516 is opened to prevent interference on trunk selection.

2. Selection

After the first digit is recorded, the local line finder is attached and relay 339 is operated, the register proceeds with hundreds selection. Ground from a front contact of relay 400, wiper 406 in position 3 of the hundreds marker switch, back contact of relay 431, front contact of relay 443, back contact of relay 445, conductor 371, wiper 323 of the register selector, back contacts of relays 341, 349, 346, front contacts of relays 339 and 326, brush 303 of the link line finder, conductor 217, brush 503 of the local line finder, front contact of relay 533 operates relay 525 and clutch magnet 517 which rotates the group selector. Revertive pulses from brush 516 of the group selector via the previously described circuit in section A-6 operates relay 429 of the register which, in turn, stops the hundreds marker switch via a back contact of relay 415 and wiper 407. When the hundreds marker switch reaches position 10, the ground circuit to relay 525 of the local link is opened and relay 429 is operated at wiper 406. The group selector continues to rotate from ground via back contacts of relays 429 and 431 which holds relay 525 operated until the next revertive pulse is received and relay 429 operates. The group selector is stopped on the first line of the correct group by the operation of relay 429 which operates relay 416. Relay 445 operates and opens the circuit for relay 429 which releases allowing the hundreds marker switch to step to position 11.

When the hundreds marker switch reaches position 11, relay 415 operates and both relays 415 and 445 lock to wiper 406 in position 11 of the hundreds marker switch. Relays 428 and 416 release. The operation of relay 415 connects ground, winding of relay 422, back contacts of relays 420 and 419, front contact of relay 415, conductor 369, wiper 321 of the register selector, back contact of relay 331, front contact of relay 339, back contacts of relays 341 and 346, brush 305 of the link line finder, conductor 219, brush 506 of the local line finder, front contact of relay 534, back contact of relay 539, front contact of relay 530 to brush 515 of the selector. Ground from back contacts of relays 429, 422 and 420, front contact of relay 415, conductor 371, wiper 323 of the register selector, back contacts of relays 341, 349 and 346, front contacts of relays 339 and 326, brush 303 of the link line finder, conductor 217, brush 503 of the local line finder, front contact of relay 533 operates relay 525 and magnet 517 of the local link. Relay 415 also closes a circuit for operating relay 431 from ground, a back contact of relay 437, front contact of relay 415, a back contact of relay 424 and a front contact of relay 443. Relay 415 also connects the ground from the back contact of relay 437 through back contacts of relays 419 and 426 to operate relay 424. Relay 424 is a slow operating relay, relay 431 opens the operating circuit for relay 429 to allow sufficient time for the selector to rotate from the first trunk position if the trunk is busy.

If the first trunk of the selected group is free, relay 422 operates in series with relay 540' of the selected trunk via brush 515 and conductor 545, back contact of relay 533, normal line finder contact 541, contact of jack 549, winding of relay 540' to battery and opens the ground circuit to relay 525 and clutch magnet 517 of the selector circuit to stop the rotation of the selector. The operation of relay 422 connects ground from a back contact of relay 429, a front contact of relay 422, a front contact of relay 415, wiper 407 to magnet 403 of the hundreds marker switch. Relay 422 also operates relays 423 and 420 in turn.

The operation of relay 420 inserts resistance 421 in series with the winding of relay 422 which releases and removes ground from magnet 403 of the hundreds marker switch. The marker switch then steps to position 12 and releases relay 445, 415 and 431. Relay 424 operates and short circuits resistance 401 in series with conductor 370 and wiper 322 of the register selector to give the register link a free line signal. This signal is ignored by the register link because the operating winding of relay 343 is short circuited at this time.

The operation of relay 422 removes a short circuit on resistance 425 to prevent clutch magnet 517 from operating. Relay 537 is operated by the operation of relay 525 and allows the local link circuit to function as previously described in section A-10 except that the front contact of relay 537 is connected via a front contact of relay 530 to the winding of relay 539 to operate relay 539 when relay 536 is operated by the release of relay 525. When relay 525 is released relays 536 and 537 release and relay 539 connects ground to selector brush 515 to hold relay 540' in the selected trunk and mark the trunk as busy.

If the first trunk of a group is busy, relay 422 does not operate when the trunk is tested. The group selector is rotated by the operation of relay 525 and clutch magnet 517 from ground via relays 429, 422, 423 and 445 of the register circuit. The group selector will rotate until a free trunk is found and relay 422 operates.

Relay 424 which operates slowly, will operate before the last trunk is reached and open the operating circuit for relay 431. The release of relay 431 closes the operating circuit of relay 429. The selector rotates to the first trunk of the next trunk group and relay 429 operates from ground on selector brush 516 through a previously described circuit. The operation of relay 429 removes ground from selector clutch magnet 517 and relay 525 to stop the rotation of the group selector. Relay 429 operates relay 440 which connects ground via relays 426, 420 and 424, conductor 368, wiper 420 of the register selector to operate relay 342 and to release as previously described in section A-8 for a line busy signal.

The reception of the second and third digits by the tens and units marker switches and counted by the link marker switch proceeds as described in section A-5.

Connections at this time have been established from the register, via a register link and a local link in which the final selector, functioning as a group selector connects line finder brushes 503 and 504 to selector brushes 514 and 515 respectively and relay 539 is operated. The connections are extended to trunk conductors 544, 545 and 546 incoming to a selected final selector in the different group. Ground from a contact of relay 539 via selector brush 515, conductor 545 of the trunk from the group selector to the final selector of the different group, holds relay 540' of the final selector.

The reference numbers that are primed (') refer to the final selector of the different group which is connected to the group selector over trunk conductors 543, 544 and 545. Relay 540' opens shunt resistance 542' and locks to conductor 545, relay 540', opens part of the starting circuit for relay 530' and operates relay 534', opens part of the circuit to finder brush 502' to prevent interference with other finders that are hunting when relay 524' is operated and closes a circuit for operating relay 524' when relay 539' is operated.

Relay 534' opens the starting circuit for the finder clutch magnet 507' to prevent its operation since the selector is being used as a final selector in conjunction with a group selector of another link. Also, relay 534' opens part of the homing circuit of the final selector clutch magnet 517', opens part of the circuit to relay 519' to prevent its operation when relay 524' operates and prepares circuits for the connection of incoming conductors 543 and 544.

The final selector circuit of the different link operates essentially in the same manner as described in sections A-6 and A-7 except that the operation of the selector clutch magnet 517' and relay 525' is controlled over conductor 543 instead of finder brush 503' and revertive pulses for the positioning of the selector are transmitted over conductor 544' instead of finder brush 505'.

The test of the called line is made in essentially the same manner as described in section A-8 except that relay 536', on operating, transfers the conductor 545 from selector brush 516' to selector brush 512' to permit the register to test the dialed line.

After the ringing is tripped and relay 534 of the preceding group selector is operated as described in section A-9, the transmission is supplied from the group selector, relay 534' is held by relay 540' for the entire connection and relay 519' is not operated when relay 524' operates. The operation of relay 519 in the preceding group selector when relay 524 operates, functions in the usual manner to connect the transmission circuit to the line.

The control of the release as described in section A-11 is extended to the final selector by the removal of ground from conductor 545 when relay 539 is released in the group selector circuit. This releases relays 540' and 534'. The homing circuit for the final selector clutch magnet 517' is closed, causing it to operate as described in section A-11 and the release of relay 534' releases relays 539' and relay 524' in turn.

C—REVERTIVE CALL

When the dialing subscriber dials for another party on the same line, a revertive call is signaled. The operations described in sections A-1 to A-7 establish connection to the calling line at the final selector. The line called is always tested busy as described in section A-8 and on a call to the same hundreds line group when relay 331 is operated, the operation of relay 342 as described in section A-8, connects relay 348 in a circuit from ground, winding of relay 348, front contacts of relays 337, 331, 342 and 339, link line finder brush 304, conductor 218, local line finder brush 504, front contact of relay 533, back contact of relay 524, front contact of relay 539, back contact of relay 530, final brush 512, conductor 226 and conductor 215 of the called line.

Resistance 355 which is connected to ground by relay 308 is also connected to conductor 215 via brush 302 of the link line finder. Relays 348 and 347 operate in turn. Relay 347 connects a direct ground to brush 302 and conductor 215 which short circuits and releases relay 348. The release of relay 348 signals a revertive call and operates relay 309 which locks. Relay 342 releases slowly from a contact of relay 347 to cover the above operation. Relay 309 connects ground from relay 326 via back contacts of relays 336, 335, a front contact of relay 309 to hold relay 326. The same ground also operates relay 346. Relay 310 is operated from a contact of relay 309 to connect revertive busy tone to the subscriber to signal the revertive call from the tone transformer, shown on Fig. 9, conductor 385, front contacts of relays 309, 347, 337, primary winding 356 of the tone coil 378. The local link is released by relay 346 which opens the holding circuit from relay 339 to brush 306 of the link line finder.

The ringing digit is recorded as described in sections A-9. The circuit waits until the dialing subscriber releases. When the loop is opened, relays 327, 328 and 308 release. Relay 326 holds from relay 309 and relay 310 operates via relay 308 and locks to relay 346. Relay 310 connects battery through resistance 345 to operate relay 343 through its left hand winding and relay 349 operates. Relay 349 connects ringing current via front contacts of relay 346 and back contacts of relay 308, brushes 300 and 301 of the link line finder to line conductors 213 and 214. It should be noted that only the called party is rung. The calling subscriber picks up his phone when he thinks the called party has answered.

When a subscriber answers, the ringing trip relay 338 operates over the loop. Relays 347, 309, 326, 343 and 349 release in turn. Relays 312, 337, 341, 334, 330 and 331 also release and the link marker switch returns to normal. Relay 346 is very slow in releasing, approximately 4 seconds, due to the network of resistances 351 and 352, and condenser 350. Revertive tone is sent to the subscriber via relay 349 normal and relay 346 operated to signal the answering subscriber that it is a revertive call and, therefore, he should wait until the calling subscriber picks up. The tone lasts approximately 3 to 4 seconds. Relays 347 and 346 release in turn to return the circuit to normal.

Removal of ground through resistance 355 and brush 302 of the link line finder from conductor 215 releases relay 205 and connects relays 202 and 206 to line conductors 213 and 214. Relays 202 and 206 hold and supply transmission battery to the subscribers. Relays 202 and 206 release when both parties hang up and the line circuit is restored to normal.

D—OUTGOING CALL TO OPERATOR

The subscriber at station 200 lifts his receiver and dials "0" on a call to the operator. The operations described in sections A-1, A-2 and A-3 result in attaching a register link and a register to the calling line and placing the link and the hundreds marker switches in position 10. Relay 333 in the register link operates and relays 330, 331 and 332 do not operate.

1.—Attaching a trunk link

The operation of relay 333 connects ground to conductor 359 to operate relay 806 in the start circuit, Fig. 8. It will be noted that the starting line of the line finder of a trunk link has priority over that of a local link as battery through resistance 812 is connected directly to the winding of relay 806 and is cut off from the winding of relay 805 so that if both relays should operate relay 806 will remain operated and relay 805 will release. Relays 807, 809 and 811 operate. Relay 807 opens the starting circuit for relays 805 and 806 to prevent interference from other calls. Relay 809 connects test potential through resistance 813 to conductor 361 which is connected via brush 305 of the link line finder to conductor 219. Relay 811 connects ground to conductor 629 for operating the line finder clutch magnets of all free trunk links.

The brushes of the line finders rotate until brush 606 encounters test potential on conductor 219 to operate relay 608. Relay 608 releases clutch magnet 607 to stop the line finder and connects ground through the winding of relay 609 and a second winding of relay 608 to brush 606. Relay 609 is operated and this low resistance path shunts down the test potential making the circuit busy, or in case of a double test, permits relay 609 of only one trunk line to remain operated as described in section A-4 in connection with the local link line finder. Relay 609 operates relay 621 and closes a circuit from finder brush 604 to relay 648 to permit the reception of the group selection signal when necessary.

Relay 621 locks to ground in the register link circuit via relay 339, line link finder brush 306, conductor 216, and trunk line finder brush 605. The operation of relay 621 opens the circuit from incoming conductor 625 to relay 626 to prevent selection of the link by a group selector and operates relay 622. In the register link circuit, relay 339 opens start circuit conductor 359 and relays 807, 809 and 811 release to stop all free line finders and remove test potential. Relay 622 opens the circuit of relays 608 and 609, and prepares the circuit from finder brush 606 to selector brush 615, opens the circuit for clutch magnet 607 to prevent the line finder from moving on the release of the test relays, opens the restoring circuit to clutch magnet 617 of the selector and provides a general operating and locking ground for the trunk link circuit.

2.—Trunk selection

The trunks to the operator are connected in multiple to the trunk link selectors of all hundreds groups as shown in Fig. 1, thus making it unnecessary to use the selector of any trunk link as a group selector on calls to the operator. As described in section A-3, the link marker switch in the register link and the hundreds marker switch in the register both step to position 10 when the calling subscriber dials "0". Relays 333 and 339 of the register link operate in turn and lock to holding ground from a contact of relay 26. Relay 333 opens the circuit of relay 329 to prevent further operation of magnet 315 of the link marker switch and connects ground to brush 304 of the link line finder, conductor 218, brush 604 of the trunk link line finder, a contact of relay 609 to operate relay 648. Relay 648 locks to ground at a contact of relay 622 and transfers the link conductors from selector brushes 610 and 611 to brushes 612 and 614, respectively, via contacts of relay 645 to utilize the terminals in the lower half of the selector arc and operates relay 647 which connects selector brush 615 to finder brush 606 and opens the circuit to selector brush 612.

As described in Section B-2, ground from relay 431 of the register is connected via the register link circuit, conductor 217, brush 603 of the trunk line finder, front contact of relay 621, back contacts of relays 637 and 636, and offnormal contact 630, to operate relay 618. The ground is extended through the winding of selector clutch magnet 617 to battery from the motor start circuit over conductors 816 to operate the clutch magnet and relays 819 and 804, of Fig. 8, and keep the motor running. The selector brushes rotate and revertive pulses from selector brush 616 operate relay 429 of the register via back contacts of relays 633, 636 and 637, front contact of relay 621, trunk line finder brush 604, conductor 218, link line finder brush 304, front contact of relay 339, back contacts of relays 342, 346, 349 and 341, wiper 324 of the register selector, conductor 372, back contacts of relays 445 and 430 to relay 429. The hundreds marker switch is stepped to position 11, and a free trunk is selected, relays 633 and 634 of the trunk line are operated in the same manner as relays 536 and 537 of the local link as described in Section B-2.

If all trunks are busy, the register is released and busy tone is sent to the calling subscriber as described in Section B-2.

If the selected trunk is free, the register connects ground through resistance 425 via conductor 371, wiper 323 of the register selector, the register link, link line finder brush 303, conductor 217 and trunk line finder brush 603 to operate relay 618 but not clutch magnet 617. Relay 618 short circuits relay 634 and holds relay 633. Relay 634 releases and operates relay 636 via a contact of relay 633. Relay 636 locks to a contact of relay 622 and connects relay 635 via selector brush 615, conductor 702, back contacts of relays 735 and 715, jack 750, to relay 734 of the two-way trunk (Fig. 7).

The free trunk signal from the register via wiper 322 of the register selector operates relays 343 and 349 in turn. Relay 343 connects battery via resistance 344, brush 306 of the link line finder, conductor 216, brush 606 of the trunk line finder, front contacts of relays 622 and 636, windings of relays 641 and 642 in series, to operate relay 642 but not relay 641. Relay 642 operates relay 644 which locks to holding ground from relay 622. Relays 343 and 349 release the register link since the second holding path for relays 308 and 326 is opened by relay 333. Relay 635 operates relay 637 which connects ground through resistance 649 to hold cutoff relay 205 of the calling line via back contact of relay 621, trunk finder brush 602 and conductor 215. Relay 644 locks to ground from relay 635, operates relay 619, opens the ground path to relay 608 to prevent further testing by the trunk finder and connects battery via resistances 640 and 652 to selector brush 613 and conductor 700 until relay 619 operates.

The release of the register link releases relays 621 and 622. Relay 621 completes the holding path to cutoff relay 202 from relay 637 and opens the paths to trunk finder brushes 603 and 604. The calling subscriber is now connected to the trunk and relay 635 connects ground for holding relays 636, 633, 648, 619 and 644.

3.—Operation of two-way trunk

Relay 734 of the two-way trunk circuit operates from ground via relay 635 of the trunk link, selector brush 615, conductor 702, contacts of relays 735 and 715 and jack 750 and opens the path for relay 735 and prepares the circuits for relays 713, 707 and 730. The momentary battery signal from the trunk link via conductor 700 operates relay 727 in advance of the connection of the subscriber's line conductors 213 and 214 through the trunk link by the operation of relay 619 to conductors 700 and 701 and relay 727 is then held by the calling subscriber. Relay 727 operates relays 712 and 713. Relay 712 reverses the battery and ground connections to trunk conductors 710 and 711 to operate a signal, not shown, before an operator in the distant exchange and connects ringing tone from conductor 748 to conductor 701 via condenser 751, front contacts of relays 715 and 712 and a back contact of relay 741.

Relay 707 is operated from battery, relay 821 of the starting circuit (Fig. 8), conductor 818, winding of relay 707, front contacts of relays 713 and 734 to ground on wiper 721 in normal position of the trunk marker switch. Relay 714 operates from contacts of relays 707 and 708 and, in turn, operates relay 715. Relay 730 operates from ground via front contacts of relays 734, 715 and 712 and prepares a circuit for the pay station line signal.

The equipment in the distant exchange is not shown but it is assumed that the line and supervisory signals are operated by reversing the current in the trunk conductors and that a calling dial may be connected to the trunk conductors for controlling the sending of dial pulses.

When the operator answers by connecting to the line, relay 708 operates and transfers the operating ground for relay 714 to holding ground for relay 713. Relay 714 releases and, in turn, releases relay 715 which disconnects the ringing tone, opens the circuit of relay 730 and completes a path for the pay station tone from conductor 702 to repeating coil 716 via back contacts of relays 735 and 715, jack 750, a contact of relay 730, back contact of relay 715, front contact of relay 712, back contact of relay 741, condenser 751 and back contact of relay 739. Relay 730 is slow releasing to provide time for the signal to be sent. If the operator should miss the signal, it can be repeated by disconnecting momentarily, thus reoperating relay 730 which will reconnect the signal.

The connection is now complete over the repeating coil bridge 716, and condensers 718 and 719.

4.—Release

When the subscriber disconnects, relay 727 releases which releases relay 712 to reverse the polarity of conductors 710 and 711 to indicate to the operator to take down the connection. The operator then disconnects and releases relay 708 which, in turn, releases relays 713 and 707. Relays 714 and 715 operate momentarily when relay 708 releases to open the holding path for relay 743 via conductor 702, selector brush 615 and relay 635 of the trunk link so that, when relay 707 releases, relay 635 can release. Relay 635 releases relays 637, 619, 636, 648 and 644. Relay 648 releases relay 647 and completes the homing path for the selector clutch magnet 617 which returns the selector to normal over its own offnormal contact 632 via contacts of relays 647 and 622. The trunk link and the two-way trunk circuits are now free for new calls.

E—INCOMING CALL FROM OPERATOR

1.—Register link attached

It will be assumed that the two-way trunks form a part of line group 200 and are connected via conductors 700, 701, 702, 703, 705 and 706 to the multiple terminals of the line finders of the register and trunk links. When the operator makes a call, a bridge, not shown, on trunk conductors 710 and 711 operates relay 708. Ground from a contact of relay 708 operates relays 713 in an obvious circuit and relay 736 via back contacts of relays 707 and 734. Relay 736 disables relay 734, prepares a circuit for relay 735, connects ground to conductor 703 to signal the register link, when attached, that the call is a trunk call, connects starting potential through resistances 742 and 743 to conductor 754 and test potentials through resistance 742 to conductor 705 similar to those of a calling line and operates relay 712 which reverses the polarity over trunk conductors 710 and 711. This reversal indicates to the operator that the trunk is hunting a register link and register.

The starting potential on conductor 754 operates relays 801, 802 and 803, in turn, of the starting circuit (Fig. 8) to complete the circuit for the register link line finder magnets 308 of any free register link line finders and to connect ground to the test relays 311. As described in sections A–1 and A–2, when a register link line finder brush 306 encounters test potential on conductor 705, it stops the line finder and reduces the starting potential on conductor 754 and all the link line finders stop. A free register is attached to the register link by the register selector.

Ground from a contact of relay 736, conductor 703, link line finder brush 303, front contact of relay 326 and back contact of relay 339 operates relay 335 to prepare the register link circuit for an incoming call. Relay 335 locks to ground at a contact of relay 326. The operation of relay 308 connects ground via resistance 355, link line finder brush 302, conductor 702 and back contacts of relays 736 and 715, contacts of jack 758 to operate relay 735 which locks to conductor 702. Relay 735 prepares a locking path for itself to a contact of relay 707 and an operating path for relay 728 via front contacts of relays 707 and 735 and back contact of relay 740, prepares the dial impulse circuit, opens the circuit for relay 734, and operates relay 707 from ground on wiper 721 in the normal position of the trunk marker switch, and front contacts of relays 735 and 713.

Relay 707 operates relay 728, locks relay 735, releases relay 736 opens the trunk marker switch restoring path, provides a general holding ground for the trunk circuit and completes the dial impulse path via back contact of relay 708, front contacts of relays 707 and 735, back contacts of relays 726 and 725, magnet 723 of the trunk marker switch to battery. The release of relay 736 releases relay 712 which, in turn, reverses the polarity of the trunk conductors 710 and 711 to indicate to the operator that dialing may begin.

2.—Reception of first, second and third digits

It is assumed that the operator dials line number 2341. At this time the register link and the register are attached to the trunk, the register link is prepared to operate on an incoming trunk call, and relay 728 of the trunk is operated. When the operator dials the first three digits of number 2341, relay 708 follows the dial pulses and repeats them to relay 327 of the register link by opening the bridge on conductors 700 and 701 via repeating coil 716, resistance 717, and contacts of relays 728 and 708. When relay 708 releases on each pulse, ground via the previously described impulse path operates magnet 723 of the trunk marker switch. The marker switch steps with the pulses and relay 714 operates in parallel with magnet 723 on the first pulse and remains operated, due to its slow release characteristics, until the end of the pulses for each digit. Relay 715 operates from relay 714 and removes the ground from brush 720 of the trunk marker switch.

Relays 725 and 726 perform the function similarly performed in the register link circuit of determining whether the called line is within the same hundreds group as the trunk and whether the digit "0" is dialed but distinguishes only between assigned and unassigned hundreds groups. When the trunk marker switch steps to a terminal corresponding to an assigned hundreds group, relay 715 is released by the release of relay 714 at the end of the pulses. Relay 725 operates from ground, a front contact of relay 707, a back contact of relay 715, wiper 720 of the trunk marker switch, back contact and winding of relay 725 to battery. Relay 725 is connected to terminals of wiper 720 corresponding to assigned hundreds numbers and locks to relay 707, opens the dial impulse circuit, opens the path for operating relay 724 from the terminals corresponding to unassigned hundreds numbers and connects ground via wiper 720 to magnet 723 to self-step the marker switch to position 9.

The marker switch is stepped to position 11 on the next two digits by ground from a front contact of relay 707, front contact of relay 715, back contacts of relays 726 and 724, front contact of relay 725, winding of magnet 723 to battery, since relay 715 operates and releases once for each digit. When relay 715 releases at the end of the last digit and the marker switch steps to position 11, ground via front contact of relay 707, back contact of relay 715 and wiper 720 operates relay 724 to short circuit the impulse contacts of relay 708 and reclose the impulse path to magnet 723 and thus provide for receiving the impulses for the ringing digit on the trunk marker switch and preventing them from being received by the link marker switch.

The pulses are received by relay 327 of the register link and repeated to the register over the instepping circuit as described in section A–3 for the first digit and section A–5 for the tens and units digits. The line marker switch in the register link and the hundreds, tens, and units marker switches in the register are positioned.

If the trunk marker switch is stepped to a position corresponding to an unassigned hundreds group relay 726 operates via the Y connections to the bank terminals of wiper 720 when relay 715 releases and the trunk circuit is held in this condition until the register link releases as described in section A–3 for the receipt of an unassigned first digit.

3.—Selection of called line in same hundreds group

A free trunk link line finder is attached substantially as described in section B–1 due to the operation of relay 335 which transfers the starting ground from conductors 358 to 359 and the line finder test potential from conductors 360 to 361, removes the alternate holding paths for relays 308 and 326 and closes the short circuiting path for relay 343.

After reception of the first digit, the register link connects ground to wiper 321 of the register selector to operate relay 431 as described in section A–3. Relay 431 opens the circuit for relay 429, opens the circuit to conductor 371 and wiper 323 to prevent operation of the final selector, removes ground from wiper 408 terminal 12 of the hundreds marker switch, and completes a circuit from ground, interrupter contact of magnet 404, front contact of relay 437, interrupter contact of magnet 403, front contacts of relays 438 and 431, wiper 408 of the hundreds marker switch, front contact of relay 431, back contact of relay 415, magnet 403 to battery, to self-step the hundreds marker switch to position 12. This cancels the hundreds selection and prepares the circuit for tens selection. Relay 431 remains operated for sufficient time to insure the stepping of the hundreds marker switch.

The revertive impulse control circuit is now closed from ground, a contact of relay 400, wiper 406 in position 12 of the hundreds marker switch, front contact of relay 437, wiper 409 in position 3 of the tens marker switch, back contact of relay 431, front contact of relay 43, back contact of relay 445, conductor 371, wiper 323 of the register selector, back contacts of relays 341, 349 and 346, front contacts of relays 339 and 326 of the register link circuit, brush 303, conductor 703, trunk line finder brush 603, front contact of relay 621, back contacts of relays 637 and 636, selector offnormal contact 630, winding of relay 618 to battery. Relay 618 operates and extends the ground to clutch magnet 617 via conductor 816 and relay 819 of the starting circuit to battery (Fig. 8), to maintain the operation of the motor. The operation of the interrupter contacts 630 opens the starting circuit for relay 618 which locks to ground from the register. Selector offnormal contact 631 opens before offnormal contact 632 closes to prevent the operation of relay 634 at this time. The finder brushes rotate to make the selection of the tens group. At this stage of the connection, relay 736 is released, conductor 703 is open in the trunk (Fig. 7), and relay 339 of the register link (Fig. 3) is operated.

Ground pulses marking the beginning of each tens group are sent to the register via final selector brush 616, back contacts of relays 633, 636 and 637, front contact of relay 621, finder brush 604, conductor 704, link line finder brush 304, front contact of relay 339, back contacts of relays 342, 346, 349 and 341, register selector wiper 324, conductor 372, back contacts of relays 445 and 430, winding of relay 429, back contacts of relays 430 and 431, front contact of relay 443, resistance 442 to battery. Relay 429 operates and closes a ground to operate magnet 404 of the tens marker switch via back contacts of relays 429 and 415, wiper 407 in position 12 of the hundreds marker switch, and a front contact of relay 437. The same contact of relay 429 also operates relay 433 which locks to ground via interrupter contact of magnet 404, front contact of relay 437, interrupter contact of magnet 403 and front contacts of relays 438 and 433 to insure that magnet 404 will take one step for each revertive pulse, however short, received.

When the tens marker switch reaches position 10, ground from a front contact of relay 400, wiper 406 position 12 and wiper 409 position 10 operates relay 428. On the next operation of relay 429, magnet 404 is energized, relay 416 is operated via the front contact of relay 428, and fundamental ground is opened from wiper 324 of the register selector for releasing relay 618 and clutch magnet 617 of the trunk link via conductor 703. Relay 445 operates from a front contact of relay 416 and opens the fundamental circuit from brush 324 of the register selector to release relay 429. The release of relay 429 de-energizes magnet 404 stepping the tens marker switch to position 11 and opens the circuit for relay 416. When the tens marker switch steps to position 11, relay 428 is released and a short time later relays 416 and 445 release in turn. The register circuit is then prepared for units selections.

The release of relay 618 and clutch magnet 617 stops the selector on the tens group as selected by the tens marker switch. In this illustration, the tens marker switch stepped from position 3 where it was set by the dial pulses, to position 11 where it was driven by the revertive pulses from brush 616 of the selector.

As described in section A–7, when an odd number is dialed for the units digit, relay 430 is operated when the tens marker switch steps to position 11 and relay 429 responds to battery pulses from selector brush 616. For even numbered units digits, relay 430 is not operated and relay 429 responds to ground pulses from selector brush 616. The release of relay 445 at the end of tens selection again connects ground to wiper 323 of the register selector and, in this example, responds to revertive ground pulses since the units digit dialed is "4" and the units marker switch is in position 4.

The revertive impulse control circuit is now closed as previously described from ground front contact of relay 400, wiper 406 of the hundreds marker switch position 12, front contact of relay 437, wiper 409 of the tens marker switch position 11, back contacts of relays 440 and 431, front contact of relay 443, back contact of relay 445, conductor 371, wiper 323 of the register selector, back contacts of relays 341, 349 and 346, front contacts of relays 339 and 326, brush 303 of the link line finder, conductor 703, brush 603 of the trunk line finder, front contact of relay 621, back contacts of relays 637 and 636, off-normal contact 630 to operate relay 618. Clutch magnet 637 is then operated to rotate the selector brushes. When relay 618 operates, relay 634 operates via selector offnormal contacts 632 and 631. Relay 634 locks to ground from relay 618, prepares an operating path for relay 633 and connects ground to the odd numbered terminals of the group.

As the selector rotates the revertive ground pulses, in this example, from selector brush 616, back contacts of relays 633, 636 and 637, front contact of relay 621, trunk link line finder brush 604, conductor 704, brush 304 of the link line finder, front contact of relay 339, back contacts of relays 342, 346, 349 and 341, wiper 324 of the register selector, conductor 372, back contacts of relays 445 and 430, winding of relay 429, back contacts of relays 430 and 431, front contact of relay 443, resistance 442 to battery, operate relay 429. The tens marker switch is again stepped by relay 429 until relay 440 is operated. Magnet 404 operates from ground, front contact of relay 429 and back contact of relay 415, wiper 407 in position 12 of the hundreds marker switch, front contact of relay 437, magnet 404 to battery. Relay 440 operates from ground, a front contact of relay 400, wiper 406 in position 12 of the hundreds marker switch, front contact of relay 437, wiper 410 in position 14, in this example of the tens marker switch, wiper 413 in position 4 of the units marker switch, winding of relay 440 to battery. The operation of relay 440 connects ground, front contact of relay 400, wiper 406 position 12, front contact of relay 437, wiper 409 positions 11—15, a front contact of relay 440, to operate relay 428 and places the fundamental ground under control of relay 429 because ground remains connected to conductor 371 from back contacts of relays 429 and 431 and a front contact of relay 443.

Ground from front contacts of relays 400 and 440 and a back contact of relay 416 operates relay 417 which connects ground via back contacts of relays 419 and 426 to the winding of slow operating relay 424. The next operation of relay 429 from ground on brush 616 of the selector removes ground from conductor 371 and relay 618 and magnet 617 release, stopping the selector. Relay 429 operates relay 416 via a front contact of relay 428. Relay 416 operates relay 445 in an obvious circuit and releases relay 429, closes a circuit from ground, winding of relay 422, back contacts of relays 420 and 419, front contacts of relays 440 and 445 to conductor 372 for testing the busy or idle condition of the called subscriber's line, and connects ground via resistance 441 and front contacts of relays 440 and 445 to conductor 371 for operating relay 618 but not magnet 617 of the final selector. Relay 445 locks to ground at a front contact of relay 417. The release of relay 429 releases relay 416. The register circuit now proceeds to test the called subscriber's line.

4.—Test of called line

When relay 618 in the trunk link releases, it opens the locking circuit for relay 634 and removes the short circuit on the winding of relay 633 which operates in series with relay 634 which holds. Selector brush 612 connects cutoff relay 205 via conductor 226, selector brush 612, back contacts of relays 647 and 618, front contact of relay 633, back contacts of relays 636 and 637, front contact of relay 621, trunk line finder brush 604, conductor 704, link line finder brush 304, front contact of relay 339, back contacts of relays 342, 346, 349 and 341, wiper 324 of the register selector, conductor 372 to the previously described circuit through front contacts of relays 445 and 440, back contacts of relays 419 and 420, winding of relay 422 to ground.

If the selected line is free, a test potential on selector brush 612 operates relay 422 which operates relays 423 and 420 in turn. When slow operating relay 424 finally operates resistance 401 in series with relay 400, conductor 370 and wiper 322 of the register selector is short circuited via a contact of relay 420 to send the line free signal to the register link.

If the selected line is busy, there will be no test potential on selector brush 612 and relay 422 does not operate. When relay 424 finally operates, ground is connected to conductor 368 and wiper 320 of the register selector, because relay 420 is not operated, via back contacts of relays 326 and 320, front contacts of relays 324 and 340 to send the line busy signal to the register link.

When the register link circuit receives a line free or busy signal, relay 343 or relay 342 is operated to release the register and register link after signalling the two-trunk circuit and the trunk link.

5.—Called line tests free

The operation of the final selector of the trunk link is similar to that of the final selector of a local link. The two-way trunk controls the connection after the register link is released and rings the called line or sends the busy signal to the operator and provides the transmission circuit for talking. When relay 445 of the register circuit operates on the last operation of relay 429 and connects ground through resistance 441 momentarily to conductor 371 and wiper 323 of the register selector, this ground via conductor 703, trunk line finder brush 603 operates relay 618 but not clutch magnet 617. The momentary operation of relay 618 connects ground via a contact of relay 633 to short circuit relay 634 and hold relay 633. Relay 636 operates while relay 633 is held from a back contact of relay 634, locks to holding ground, connects trunk line finder brush 606 to relays 641 and 642 and transfers the line test connection from contacts of relay 633 to contacts of relay 636 in preparation for the release of relay 633.

The line free signal relay 343 connects resistance 344 from battery via brush 305 of the link line finder, conductor 706 and trunk line finder brush 606 to operate relay 642 without operating relay 641. Relay 642, in turn, operates relay 644, relay 619 via back contact of relay 626 and relay 637 and locks to holding ground from relay 622. Relay 619 connects the line circuit from conductors 700 and 701 of the two-way trunk circuit via trunk line finder brushes 600 and 601 and selector brushes 610 and 611 to line conductors 223 and 224. Relay 637 connects grounded resistance 639 via back contact of relay 643, front contact of relay 636, back contact of relay 647 and selector brush 612 to conductor 224 to hold the called line busy.

In the two-way trunk (Fig. 7) the ground through high resistance 344, brush 305 of the link line finder and conductor 706 also operates relay 738 which operates relay 740. Relay 740 releases relay 728 and connects the pickup interrupter ground from conductor 753, front contacts of relays 740, 724 and 726 to operate relay 733 which locks to a contact of ringing trip relay 732. Relay 733 releases relay 724 and connects the ringing leads via conductors 700 and 701 and the trunk link to conductors 223 and 224 of the desired line and ring back tone to the trunk conductors 710 and 711 via repeating coil 716. Ringing current is connected to conductor 701 or 702 by contacts of relay 749.

It is noted that the operation of relay 733 is dependent upon the operation of relay 726 which is not operated until after the dial pulses of the ringing digit have set the trunk marker switch as will be described in section 7.

Relay 728, in releasing, transfers the connections to repeating coil 716 from the bridge resistance 717 to relay 727 to prepare for release supervision.

Ringing current is now sent to the called subscriber's line conductors 223 and 224 from the harmonic ringing conductors 900 via brush 722 of the trunk marker switch, and winding of the ringing trip relay 732.

6.—Called line tests busy

If the selected line tests busy, relay 342 is operated in the register link circuit and connects low resistance 340 from battery, front contacts of relays 342 and 335, back contact of relay 346, link line finder brush 305, conductor 706, line finder brush 606 of the trunk link to operate relays 641 and 642 in the trunk line. Relay 643 operates from relay 641 but relay 644, which is slow to operate, does not operate before relay 641 opens its operating path. Relay 643 holds from ground on line conductor 226 via selector brush 612 and connects ground to conductor 703 via a contact of relay 621 and trunk line finder brush 603.

Relays 737 and 738 also operate in the two-way trunk circuit from battery via resistance 340. Relay 738 closes the operating path for relay 740 from a back contact of relay 737. Relay 740 does not operate before relay 737 operates and relay 739 operates from relay 737 on the busy signal. Relay 739 prepares the operating circuit for relay 741. Ground from relay 643 of the trunk link via a contact of relay 621, trunk line finder brush 603, conductor 703, a back contact of relay 736 and a front contact of relay 739 operates relay 731 which operates relay 729 in turn. Relay 709 operates in parallel with relay 739 and opens the transmission bridge to condenser 719. Relay 712 now operates from the 60 I. P. M. busy tone and flashing ground interrupter of Fig. 9 via conductor 747, front contact of relay 729, back contact of relay 741, front contact of relay 709 and back contact of relay 715 to reverse the polarity of trunk conductors 710 and 711 to indicate to the operator that the desired line is busy. The operator may now release or monitor the line.

If the operator desires to monitor a busy line, she dials "1." This releases relay 708 momentarily and provides a ground pulse via back contacts of relays 708, 707, 735, 724 and 725 to operate relay 741 which locks to holding ground, releases relay 712, and connects the trunk to conductors 700 and 701 via condensers 751 and 752, thus permitting the operator to monitor the call. When the line becomes free, relay 643 in the trunk link releases and removes ground from conductor 703 which releases relay 731 and in turn relay 729, which is slow to release. Relay 731 closes a momentary path for operating relay 740 to release relay 709, 739 and 741 in turn. Connection with the called line now proceeds as a call to a free line.

The operation of the final selector and the register on calls to P. B. X groups is the same as described for the local link.

7.—Reception of fourth digit and ringing

After the first three digits have been dialed and recorded on the trunk, link, hundreds, tens and units marker switches as described in section D-2, the trunk marker switch has stepped to position 11 and receives the pulses for the fourth digit to select the ringing current. Fully selective harmonic ringing is used as per the following table:

| Party | Frequency | Relays Operated | Line Conductor |
|---|---|---|---|
| 1 | 33 | 726 | 701-224 |
| 2 | 50 | 726 | 701-224 |
| 3 | 66 | 726 | 701-224 |
| 4 | 16 | 726 | 701-224 |
| 5 | 25 | 726 | 701-224 |
| 6 | 33 | 726 and 749 | 700-223 |
| 7 | 50 | 726 and 749 | 700-223 |
| 8 | 66 | 726 and 749 | 700-223 |
| 9 | 16 | 726 and 749 | 700-223 |
| 10 | 25 | 726 and 749 | 700-223 |

At this stage of the connection relay 724 is operated. Relay 708 follows the dial pulses but does not repeat them to the register link because a front contact of relay 724 short circuits the pulsing contact of relay 708. Magnet 723 is operated to step the trunk marker switch one step for each pulse in a circuit from ground, back contact of relay 708, front contacts of relays 707 and 735, back contact of relay 726, front contact of relay 724, magnet 723 to battery. When the pulses cease, relay 715 connects ground via brush 720 of the trunk marker switch to operate relays 726 and 749 in accordance with the above table. In this example, the fourth digit is "1" and the trunk marker switch takes one step to position 12 and relay 726 is operated. As described in section E-5 when the line free signal is received from the register link and relay 740 is operated, relay 733 operates if the trunk marker switch has been set by the dial pulses. If the dial pulses for the ringing digit have not set the link marker switch, relay 733 awaits the operation of relay 726 to send ringing current to the selected subscriber's line as described in section E-5.

8.—Selection of a called line in a different hundreds group

The selection of a called line in a different hundreds group requires the selector of the trunk link to operate as a group selector to select a trunk to the selector of a free trunk link, serving the desired hundreds group. The latter selector is then operated as a final selector to select and test the desired line. The terms "group selector" and "final selector" are used in the following description and number designations for the final selector are primed ('). The operations of these selectors are substantially the same as described in section B for a local connection. A register link and a register are attached as described in sections E-1 and the digits are received as described in section E-2. When a trunk line finder is attached as described in section E-3, relay 648 is operated to transfer the trunk link conductors from group selector brushes 610 and 611 to group selector brushes 614 and 615. Relay 647 operates from relay 648, disconnects group selector brush 612 and connects group selector brush 615, back contacts of relays 645 and 636, front contact of relay 622 to line finder brush 606 for testing for a free trunk.

Selection is controlled by the register as described in section B-2 for local links. Relay 622 has connected conductors 703 and 704 through trunk line finder brushes 603 and 604 to the trunk link circuit. Relay 618 is operated from ground in the register circuit over conductor 703, and, in turn, operates the group selector clutch magnet 617. The group selector rotates to make the selection of the desired trunk group. The clutch magnet 617 and relay 618 lock over offnormal contact 630 to ground in the register via conductor 703. Ground pulses marking the beginning of the trunk groups are sent to the register via group selector brush 616, back contacts of relays 633, 636 and 637, front contact of relay 621, trunk finder brush 604 and conductor 704. When the register receives that number of revertive pulses indicating the group selector is at the trunk group corresponding to the digit dialed, it removes ground from conductor 703 to stop the group selector and releases relay 618 and group selector clutch magnet 617.

The register reoperates relay 618 when it is ready to control the hunting for a free trunk. Relay 618 energizes the group selector clutch magnet 617 and provides an operating path for relay 634 which locks to ground at a front contact of relay 618, prepares an operating path for relay 633 which, in turn, prepares for the operation of the end of selection relay 636. As the group selector rotates, the register is testing the trunks for a free or busy condition via conductor 706, trunk line finder brush 606, front contact of relay 622, back contacts of relays 636 and 645, front contact of relay 647 and group selector brush 615. When a free trunk is encountered the register removes the ground from conductor 703, releasing relay 618 and group selector clutch magnet 617 to stop the group selector. Relay 634 remains operated and relay 633 operates in series with it. Relay 636 now operates over front contacts of relays 633, 648 and 634. The register connects resistance ground, momentarily, on conductor 703 to operate relay 618 which, in turn, operates and shunts the winding of relay 634 which releases. Relay 633 locks to relay 618 but releases after relay 618 releases when the ground is removed by the register. Relay 636, which operated with relay 633, locks to ground on relay 622 and connects selector group brush 615 to relay 635.

Ground through the winding of relay 635, group selector brush 615 and conductor 625 operates relay 626' of the free final selector. Relay 626' operates relay 622' which connects conductors 623 and 624 to the final selector circuit in place of the connections from line finder brushes 603' and 604' of the selected trunk link in which the associated selector now operates as a final selector.

If all the trunks to the final selector are busy the register sends a busy signal to the register link. Relay 424 operates before the last trunk is reached and opens the operating circuit for relay 431. Release of relay 431 closes the operating circuit for relay 429 and, when the first line of the next group is reached, relay 429 operates. This removes ground from conductor 371 and releases relay 618 and clutch magnet 617 to stop the rotation of the group selector. Relay 440 of the register then operates and connects ground through back contacts of relays 426 and 420 and front contacts of relays 424 and 440, to conductor 363, wiper 320 of the register selector, back contact of relay 341, front contacts of relays 334 and 339, back contacts of relays 342 and 347, winding of relay 342 to battery. The operation of relay 342 connects battery through resistance 340, front contacts of relays 342 and 335, a back contact of relay 346, brush 305 of the link line finder, conductor 706, front contact of relay 735, windings of relays 737 and 738 in the trunk circuit to ground. The resistance 340 is of such value that relays 737 and 738 both operate. Relay 740 is prevented from operating, because of its slow operating characteristic, and relays 739 and 709 operate from ground at a front contact of relay 737. The operation of relay 709 connects the 120 I. P. M. flashing interrupter of Fig. 9 via conductor 746, back contacts of relays 729 and 741, a front contact of relay 709, a back contact of relay 715, winding of relay 712 to battery. Relay 712 reverses the current to trunk conductors 710 and 711 at a rate of 120 reversals per minute to signal the operator that the trunks are busy and that the connection should be immediately released by opening the trunk conductors and releasing relay 708.

When interrupted ground from the interrupters 60 or 120 I. P. M. of Fig. 9 over conductors 746 and 747, depending upon the released or operated condition of relay 729, is used to give a flashing signal through the operation of relay 712, over trunk conductors 710 and 711, as previously described, an interrupted busy tone at the same rate over conductors 744 and 745, similarly depending upon the released or operated condition of relay 729, is conencted through a back contact of relay 741, condenser 752, a front contact of relay 739 to the repeating coil 716 to give the operator an audible signal that either all the trunks are busy or that the called line is busy.

The selection of the desired line is made as described in section E–3 the fundamental circuit being connected to the register via conductors 623 and 624, brushes 613 and 614, back contact of relay 645, front contact of relay 648 and front contacts of relays 619, 637 and 621 of the preceding group selector, associated trunk line finder brushes 603 and 604 and conductors 703 and 704.

The test of the selected line is made by the register and the final selector as described in section E–4. The free line signal is passed through the group selector circuit when relay 642 operates and, in turn, operates relay 644. The operation of relay 644 connects battery via resistance 640, a back contact of relay 619, resistance 642, front contact of relay 644, back contact of relay 645, group selector brush 613, conductor 623 to windings of relays 641' and 642' of the final selector to ground. Relay 642' operates as described in section E–4. Relay 619 is operated in the group selector to transfer the group selector brushes 613 and 614 from finder brushes 603 and 604 to finder brushes 600 and 601. The register link releases but relays 621 and 622 are held operated by the two-way trunk via finder brush 605, conductor 705, back contact of relay 736, front contacts of relays 740 and 707 to ground.

When a busy signal is received from the register link relays 641, 642 both operate. Relay 641 repeats the low resistance battery by connecting resistance 640 via group selector brush 613 and conductor 623 to relays 641' and 642' of the final selector. Relay 643 operates and connects ground via a contact of relay 621, trunk line finder brush 603 and conductor 703 to operate relay 731 of the two-way trunk circuit as described in section E–4. Relay 619 operates to connect the line wires through the group selector to the final selector and the circuit awaits the freeing of the busy line or release by the two-way trunk circuit.

9.—Talking, supervision and release

At the end of section E–6 it is noted that ringing current is connected to the line conductors through a winding of the ringing trip relay 732 when relay 733 is operated. When the called subscriber answers the ringing trip relay 732 is operated and relay 733 releases. The called subscriber's line connected through the trunk link to conductors 700 and 701 is extended through back contacts of relays 733 and 739 to the repeating coil 716 and talking battery is supplied through the windings of relay 727 which operates. Relay 727 operates relay 712 to reverse the current to trunk conductors 710 and 711 to signal the operator that the call has been answered. Supervision to the operator is obtained by the release and reoperation of relay 712 under control of relay 727 which, in turn, is controlled by the called subscriber. If the operator should wish to recall a subscriber who has hung up she will dial "1" which releases relay 708 and connects ground via back contact of relay 708, front contacts of relays 707, 735, 726 and 725, back contacts of relays 741 and 749 to operate relay 724. The pickup interrupter is now connected over conductor 753 from Fig. 9 through front contacts of relays 740, 724 and 726 to operate relay 723. Ringing is now applied to the calling subscriber's line as previously described.

When the subscriber disconnects first, relay 727 releases and, in turn, releases relay 712 which reverses the polarity of trunk conductors 710 and 711 indicating to the operator that the call is completed. The trunk waits for the disconnect by the operator which will release relay 708 and, in turn, relay 713 and 707. Relay 707 removes holding ground from conductor 705 and the remaining relays which now release and free the trunk circuit. The trunk marker switch returns to normal via its own interrupter contact, brush 721 and a contact of relay 707. When holding ground is removed from conductor 705, relays 621 and 622 release. Relay 622 removes the holding ground for the trunk link circuit which releases. The group selector returns to its normal position, clutch magnet 617 being energized from ground on offnormal contact 632 via back contacts of relays 648 and 622. The final selector is released from the group selector by removing the grounded winding of relay 635 from conductor 625 to release relay 626' of the final selector circuit. The release of relay 626' releases relay 622' which opens holding ground and closes the circuit for restoring the final selector to normal.

When the operator disconnects, first relay 708 releases and releases relays 713 and 707 which, in turn, removes holding ground for the remaining relays with the exception of relay 727 and 712. Relay 727 releases, when the trunk link opens the circuit to the subscriber's line, and releases relay 712. The release of relay 205 of the line circuit connects relays 202 and 206 to the line to hold the line circuit in the lockout condition until the subscriber hangs up.

F—TIME RELEASE

Provision is made for releasing the register link if it is held for an undue length of time. Relay 336 of the register link is connected via a make contact of the link holding relay 326 and conductor 366 to a timing interrupter which momentarily closes to ground in 2 minute intervals. Relay 336 locks to ground from wiper 318 positions 1 to 11 of the link marker switch via a front contact of relay 326, a back contact of relay 337 and a front contact of relay 336. Operated relay 336 connects ground interrupted once per minute from Fig. 9, conductor 367, a back contact of relay 335 and a front contact of relay 327 to hold relay 328. The two interrupters are so synchronized that a delay of from 40 to 60 seconds is provided. The locking circuit for relay 336 is opened each time a digit is dialed, thus providing another timing period.

When the time release occurs, relays 328, 326 and 308 release in turn, restoring the register link to normal and sending the subscriber's line circuit to the lockout condition.

While we have described above the principles of our invention in connection with specific apparatus, it is to be clearly understood that this description is made only by way of example and not as a limitation to the scope of our invention.

What is claimed is:

1. In an automatic telephone system, a plurality of subscribers' and trunk lines, means associated with said lines for calling the number of the called line, local links having line finders and final selectors, trunk links having line finders and final selectors, a register, means for connecting the register with the calling line, means controlled by the register responsive to the number called for associating a local or trunk link over its line finder with the calling line independently of the means for connecting the register with the calling line, and means controlled by the register responsive to the number called for connecting to the called line the link associated with the calling line over the final selector of the link.

2. The system according to claim 1 wherein the means for connecting the register with the calling lines includes a line finder.

3. The system according to claim 1 wherein the means for connecting the register with the calling line includes a register selector.

4. The system according to claim 1 wherein the means for connecting the register with the calling line includes a register link.

5. The system according to claim 4, and means operative upon the connection of the called line for disconnecting the register link.

6. The system according to claim 1 wherein the means for connecting the register with the calling line includes a line finder, a register link and a register selector.

7. The system according to claim 6 and means operative upon connection of the called line for disconnecting the register and register link.

8. The system according to claim 1, and means operative upon the connection of the called line for disconnecting the register.

9. In an automatic telephone system, a plurality of subscribers' and trunk lines, means associated with said lines for calling the number of a called line, local links, trunk links, a register, means for connecting the register with the calling line, means forming part of a local or trunk link comprising a line finder and controlled by the register depending on the number called for associating a local or trunk link with the calling line independently of the means for connecting the register with the calling line, and means comprising a selector forming part of the link associated with the calling line and controlled by the register depending on the number called for connecting to the called line the link associated with the calling line.

10. The system according to claim 9, and in which each link has a line finder and a selector.

11. The system according to claim 10, and connections from each trunk line to the line finders of trunk links.

12. The system according to claim 11, and connections from each trunk line to the selectors of trunk links.

13. The system according to claim 9, and connections from each trunk line to the means for connecting the register with the calling line.

14. In an automatic telephone system, a plurality of subscribers' and trunk lines, means associated with said lines for calling the number of a called line, local links having line finders and final selectors, trunk links having line finders and final selectors, register links, a register, means for connecting a register link with the calling line, means for connecting the register link with the register, means in the register links responsive to a digit of the number called for associating a local or trunk link over its line finder with the calling line independently of the means for connecting the register link with the calling line, and means controlled by the register in accordance with other digits of the number called for connecting to the called line the link associated with the calling line over its final selector.

15. The system according to claim 14, and means operative upon the connection of the called line for disconnecting the register.

16. The system according to claim 14 wherein each register link has a line finder and a register selector.

17. The system according to claim 14, and connections from the trunk lines to the finders of the register and trunk links and the selectors of the trunk links.

18. The system according to claim 14 wherein the register link includes means for providing a busy tone.

19. The system according to claim 14 wherein the register link includes means for providing a dial tone.

20. The system according to claim 14, wherein the register link includes means for providing busy and dial tones.

21. The system according to claim 20, and means in the register for controlling the application of busy and dial tones to the calling line.

22. The system according to claim 14, and means in the register for controlling the ringing of the called line.

23. The system according to claim 14, and means in the register link for ringing the called line.

24. The system according to claim 14 wherein the register link includes means responsive when the called number is the same as the calling number for producing a revertive tone.

25. The system according to claim 14 wherein the register link includes means responsive when the called number is the same as the calling number for producing revertive call ringing.

26. The system according to claim 14 wherein the register link includes means responsive when the called number is the same as the calling number for producing a revertive answered tone.

27. In an automatic telephone system, a plurality of groups of subscribers' lines, trunk lines, means associated with said lines for calling the number of a called line, local and trunk links for each group of lines, each link having a line finder and a final selector, a register, means for connecting the register with the calling line in any group, means controlled by the register for associating a local or trunk link of the calling line group over its line finder with the calling line independently of the means for connecting the register with the calling line, and means responsive to the number called for connecting to the called line the link associated with the calling line over its final selector.

28. The system according to claim 27 wherein the means for connecting the register with the calling line includes a register link for each group of lines.

29. The system according to claim 27, and a trunk interconnecting the local links of all groups.

30. In an automatic telephone system, a plurality of groups of subscribers' lines, trunk lines, means associated with said lines for calling the number of a called line, local, trunk and register links for each group of lines, a finder and a selector for each link, a register accessible to the selectors of all register links, means operative upon the initiation of a call for operating the finder of a register link in the calling line group to connect with the calling line, means controlled by a register link for operating a finder to associate a local or trunk link of the calling line group directly with the calling line, and means controlled by the register for connecting to the called line of any group the link associated with the calling line over the selector for said link.

31. The system according to claim 30, and connections from the trunk lines to the finders of the register and trunk links of one group.

32. The system according to claim 30, and connections from the trunk lines to the selectors of the local and trunk links of all groups.

33. The system according to claim 30, and a trunk interconnecting the local links of all groups, as well as the selectors thereof.

34. The system according to claim 30, and connections from the trunk link of one group to the selectors of the trunk links of another group.

35. The system according to claim 30, and connections from the last-mentioned selectors to the trunk lines.

36. In an automatic telephone system, a multi-party calling line, a called line, a register, a register link comprising a line finder and a register selector for connecting the register to the calling line, a local link comprising a line finder and a selector for connecting the calling line to the called line, means in the register link for connecting the local link line finder to the calling line and for connecting the local link selector to the register, means in the register for selectively operating the selector, means in the register link for determining when the selected line is the calling line and means in said register link for applying a revertive call tone to said calling line when said register link determines that said selected line is said calling line.

37. The system according to claim 36, and means in said register link for ringing said called party on said calling multi-party line.

38. In an automatic telephone system, a multi-party calling line having a line circuit, a called line, a register for controlling the establishment of connections from the calling line, a register link comprising a line finder and a register selector for connecting the register to the calling line, a local link comprising a line finder and a selector for connecting the calling line to the called line, means in the register link for connecting the local link line finder to the calling line and for connecting the local link selector to the register, means in the register link for recognizing a revertive call from a calling to a called party on the multi-party calling line, and means in said calling line circiut for supplying talking battery to both parties on a revertive call.

39. In an automatic telephone system, a community and a city exchange interconnected by trunk lines, subscriber's lines connected to the exchanges, calling dials at the subscriber's stations for controlling the sending of digit pulses representing numbers, automatic switching equipment at the community exchange comprising registers for controlling the establishment of connections, register links including line finders and register selectors for connecting said subscriber's lines to said registers, local connecting links including line finders and connectors connected directly to said subscribers' lines and adapted to be used as final or group selectors, trunk links including line finders and selectors connected directly to said subscribers' lines and adapted to be used as group or final selectors, means in the register links and registers for recording digit pulses and for operating the line finders of local or trunk links, and means in the register links for discriminating between the local or trunk links depending upon the first digit dialed.

40. In an automatic telephone system, a community and a city exchange interconnected by trunk lines, subscriber's lines connected to the exchanges, calling dials on the subscriber's lines for controlling the sending of digit pulses representing numbers, automatic switching equipment at the community exchange comprising registers including digit marker switches, register links including line finders and register selectors for connecting said subscribers' lines to said registers, local connecting links including line finders and selectors connected directly to said subscribers' lines and adapted to be used as group or final selectors, trunk links including line finders and selectors connected directly to said subscribers' lines and adapted to be used as group or final selectors, means in the register links and registers for recording digit pulses, means in the register links for sending a busy tone signal to a calling line and means in said register links for sending said busy signal to a calling subscriber's line when no dial pulses are recorded within a predetermined interval.

41. In an automatic telephone system, a central office, a community office including subscribers' lines divided into groups, each group designated by the first digit of the line number, groups of register links corresponding to said group of lines, each link comprising a line finder connected to said lines of the group, a register selector and a rotary switch, registers connected to said register selectors and including digit switches for controlling the selection of a called line, a two-way trunk circuit at the community office including a rotary switch for completing the connections between the subscribers' lines and the central office, groups of trunk links corresponding to groups of subscribers' lines, each trunk link comprising a line finder and a selector connected to said subscribers' lines, connections from the two-way trunk circuit to a particular group of trunk links, means in the two-way trunk circuit responsive to dial pulses from the central office for operating the rotary switch of the two-way trunk circuit and for repeating the dial pulses to operate the rotary switch of a register link and a digit switch of a register, means in the two-way trunk circuit controlled by the rotary switch for distinguishing between first digit numbers representing assigned and unassigned groups of lines, means in the register links controlled by the rotary switch for distinguishing between first digit numbers representing the same or other groups of lines and groups of unassigned lines, means responsive to said distinguishing means for causing the release of said register link and means in said trunk circuit responsive to the position of the rotary switch for holding said trunk circuit until said register link releases when said rotary switch is in a position representing an unassigned group of lines.

42. The system according to claim 41 and means in said register link controlled by the position of said rotary switch for releasing said trunk link and restoring said two-way trunk circuit to its normal condition when said rotary switch is stepped to a position representing an unassigned line group.

43. The system according to claim 41 and means controlled by said rotary switch in said register link for signalling said register to cancel selection in accordance with said first digit when said rotary switch is stepped to a position representing the group of lines to which said two-way trunk circuit is connected.

L. JOHN DENNEY.
HOWARD G. DUHAMEL.
RALPH W. ENGSBERG.

REFERENCES CITED

The following references are of record in the file of this patent:

UNITED STATES PATENTS

| Number | Name | Date |
|---|---|---|
| 1,450,321 | Lundell | Apr. 3, 1923 |
| 1,646,262 | Schwartz | Oct. 18, 1927 |
| 1,729,858 | Ruggles | Oct. 1, 1929 |
| 1,857,833 | Baker | May 10, 1932 |